United States Patent
Morales et al.

(10) Patent No.: US 12,039,497 B2
(45) Date of Patent: *Jul. 16, 2024

(54) SYSTEMS AND METHODS TO PROVIDE MEASURES OF USER WORKLOAD WHEN GENERATING UNITS OF WORK BASED ON CHAT SESSIONS BETWEEN USERS OF A COLLABORATION ENVIRONMENT

(71) Applicant: Asana, Inc., San Francisco, CA (US)

(72) Inventors: Alvaro Morales, San Francisco, CA (US); Eric Lee Campbell, Oakland, CA (US); Manya Sofia Spieczny Scheps, Berkeley, CA (US)

(73) Assignee: Asana, Inc., San Francisco, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/339,487

(22) Filed: Jun. 22, 2023

(65) Prior Publication Data

US 2023/0334426 A1 Oct. 19, 2023

Related U.S. Application Data

(63) Continuation of application No. 17/102,147, filed on Nov. 23, 2020, now Pat. No. 11,769,115.

(51) Int. Cl.
*G06Q 10/10* (2023.01)
*G06Q 10/06* (2023.01)
(Continued)

(52) U.S. Cl.
CPC ... *G06Q 10/103* (2013.01); *G06Q 10/063114* (2013.01); *G06Q 10/06316* (2013.01);
(Continued)

(58) Field of Classification Search
CPC ......... G06Q 10/103; G06Q 10/063114; G06Q 10/06316; G06Q 10/0633; G06Q 10/101; H04L 12/1831
See application file for complete search history.

(56) References Cited

U.S. PATENT DOCUMENTS

| 5,233,687 A | 8/1993 | Henderson, Jr. |
| 5,524,077 A | 6/1996 | Faaland |

(Continued)

FOREIGN PATENT DOCUMENTS

| CN | 101305350 A | 11/2008 |
| CN | 101563671 A | 10/2009 |

(Continued)

OTHER PUBLICATIONS

Crescencio Bravo, "A groupware system to support collaborative programming: Design and Experiences," 2013, The Journal of Systems and Sofware, 86, pp. 1759-1771. (Year: 2013).*

(Continued)

*Primary Examiner* — Tan D Nguyen
(74) *Attorney, Agent, or Firm* — Esplin & Associates, PC

(57) ABSTRACT

Systems and methods provide measures of user workload when generating units of work based on chat sessions between users of a collaboration environment are described herein. Exemplary implementations may: manage environment state information maintaining a collaboration environment, obtain content information characterizing content of chat sessions between users, identify potential units of work, identify potential assignees of the potential units of work, obtain the user records of the potential assignees, generate views of a workload display pane, and/or perform other operations.

20 Claims, 3 Drawing Sheets

(51) Int. Cl.
  *G06Q 10/0631* (2023.01)
  *G06Q 10/0633* (2023.01)
  *G06Q 10/101* (2023.01)
  *H04L 12/18* (2006.01)

(52) U.S. Cl.
  CPC ....... *G06Q 10/0633* (2013.01); *G06Q 10/101* (2013.01); *H04L 12/1831* (2013.01)

(56) References Cited

U.S. PATENT DOCUMENTS

| | | |
|---|---|---|
| 5,530,861 A | 6/1996 | Diamant |
| 5,608,898 A | 3/1997 | Turpin |
| 5,611,076 A | 3/1997 | Durflinger |
| 5,623,404 A | 4/1997 | Collins |
| 5,721,770 A | 2/1998 | Kohler |
| 5,983,277 A | 11/1999 | Heile |
| 6,024,093 A | 2/2000 | Cron |
| 6,256,651 B1 | 7/2001 | Tuli |
| 6,292,830 B1 | 9/2001 | Taylor |
| 6,332,147 B1 | 12/2001 | Moran |
| 6,385,639 B1 | 5/2002 | Togawa |
| 6,621,505 B1 | 9/2003 | Beauchamp |
| 6,629,081 B1 | 9/2003 | Cornelius |
| 6,769,013 B2 | 7/2004 | Frees |
| 6,859,523 B1 | 2/2005 | Jilk |
| 7,020,697 B1 | 3/2006 | Goodman |
| 7,039,596 B1 | 5/2006 | Lu |
| 7,086,062 B1 | 8/2006 | Faour |
| 7,349,920 B1 | 3/2008 | Feinberg |
| 7,418,482 B1 | 8/2008 | Lusher |
| 7,428,723 B2 | 9/2008 | Greene |
| 7,640,511 B1 | 12/2009 | Keel |
| 7,676,542 B2 | 3/2010 | Moser |
| 7,779,039 B2 | 8/2010 | Weissman |
| 7,805,327 B1 | 9/2010 | Schulz |
| RE41,848 E | 10/2010 | Daniell |
| 7,844,287 B2 | 11/2010 | Bengtsson |
| 7,917,855 B1 | 3/2011 | Satish |
| 7,996,744 B2 | 8/2011 | Ojala |
| 7,996,774 B1 | 8/2011 | Sidenur |
| 8,214,747 B1 | 7/2012 | Yankovich |
| 8,314,809 B1 | 11/2012 | Grabowski |
| 8,499,300 B2 | 7/2013 | Zimberg |
| 8,522,240 B1 | 8/2013 | Merwarth |
| 8,527,287 B1 | 9/2013 | Bhatia |
| 8,554,832 B1 | 10/2013 | Moskovitz |
| 8,572,477 B1 | 10/2013 | Moskovitz |
| 8,627,199 B1 | 1/2014 | Handley |
| 8,639,552 B1 | 1/2014 | Chen |
| 8,676,792 B1 | 3/2014 | Scatamacchia |
| 8,768,751 B2 | 7/2014 | Jakowski |
| 8,831,879 B2 | 9/2014 | Stamm |
| 8,843,832 B2 | 9/2014 | Frields |
| 8,863,021 B1 | 10/2014 | Bee |
| 9,009,096 B2 | 4/2015 | Pinckney |
| 9,024,752 B2 | 5/2015 | Tumayan |
| 9,143,839 B2 | 9/2015 | Reisman |
| 9,152,668 B1 | 10/2015 | Moskovitz |
| 9,201,952 B1 | 12/2015 | Chau |
| 9,208,262 B2 | 12/2015 | Bechtel |
| 9,251,484 B2 | 2/2016 | Cantor |
| 9,350,560 B2 | 5/2016 | Hupfer |
| 9,383,917 B2 | 7/2016 | Mouton |
| 9,405,532 B1 | 8/2016 | Sullivan |
| 9,405,810 B2 | 8/2016 | Smith |
| 9,454,623 B1 | 9/2016 | Kaptsan |
| 9,514,424 B2 | 12/2016 | Kleinbart |
| 9,600,136 B1 | 3/2017 | Yang |
| 9,645,994 B2 | 5/2017 | Agarwal |
| 9,674,361 B2 | 6/2017 | Ristock |
| 9,712,576 B1 | 7/2017 | Gill |
| 9,715,496 B1 | 7/2017 | Sapoznik |
| 9,785,445 B2 | 10/2017 | Mitsui |
| 9,830,398 B2 | 11/2017 | Schneider |
| 9,842,312 B1 | 12/2017 | Rosati |
| 9,949,681 B2 | 4/2018 | Badenes |
| 9,953,282 B2 | 4/2018 | Shaouy |
| 9,959,420 B2 | 5/2018 | Kiang |
| 9,978,040 B2 | 5/2018 | Lee |
| 9,990,636 B1 | 6/2018 | Lewis |
| 10,001,911 B2 | 6/2018 | Breedvelt-Schouten |
| 10,003,693 B2 | 6/2018 | Wolthuis |
| 10,083,412 B2 | 9/2018 | Suntinger |
| 10,157,355 B2 | 12/2018 | Johnson |
| 10,192,181 B2 | 1/2019 | Katkar |
| 10,235,156 B2 | 3/2019 | Johnson |
| 10,264,067 B2 | 4/2019 | Subramani |
| 10,308,992 B2 | 6/2019 | Chauvin |
| 10,373,084 B2 | 8/2019 | Kurjanowicz |
| 10,373,090 B2 | 8/2019 | Holm |
| 10,382,501 B2 | 8/2019 | Malatesha |
| 10,455,011 B2 | 10/2019 | Kendall |
| 10,496,943 B2 | 12/2019 | De |
| 10,594,788 B2 | 3/2020 | Larabie-Belanger |
| 10,606,859 B2 | 3/2020 | Smith |
| 10,613,735 B1 | 4/2020 | Karpe |
| 10,616,151 B1 | 4/2020 | Cameron |
| 10,623,359 B1 | 4/2020 | Rosenstein |
| 10,671,692 B2 | 6/2020 | Koopman |
| 10,684,870 B1 | 6/2020 | Sabo |
| 10,706,484 B1 | 7/2020 | Murnock |
| 10,728,199 B2 | 7/2020 | Grochocki, Jr. |
| 10,785,046 B1 | 9/2020 | Raghavan |
| 10,810,222 B2 | 10/2020 | Koch |
| 10,846,105 B2 | 11/2020 | Granot |
| 10,846,297 B2 | 11/2020 | Smith |
| 10,922,104 B2 | 2/2021 | Sabo |
| 10,956,845 B1 | 3/2021 | Sabo |
| 10,970,299 B2 | 4/2021 | Smith |
| 10,977,434 B2 | 4/2021 | Pelz |
| 10,983,685 B2 | 4/2021 | Karpe |
| 11,082,281 B2 | 8/2021 | Rosenstein |
| 11,095,468 B1 | 8/2021 | Pandey |
| 11,113,667 B1 | 9/2021 | Jiang |
| 11,138,021 B1 | 10/2021 | Rosenstein |
| 11,140,174 B2 | 10/2021 | Patel |
| 11,204,683 B1 | 12/2021 | Sabo |
| 11,212,242 B2 | 12/2021 | Cameron |
| 11,263,228 B2 | 3/2022 | Koch |
| 11,288,081 B2 | 3/2022 | Sabo |
| 11,290,296 B2 | 3/2022 | Raghavan |
| 11,310,294 B2 | 4/2022 | Faulkner |
| 11,327,645 B2 | 5/2022 | Karpe |
| 11,341,444 B2 | 5/2022 | Sabo |
| 11,341,445 B1 | 5/2022 | Cheng |
| 2002/0065798 A1 | 5/2002 | Bostleman |
| 2002/0082889 A1 | 6/2002 | Oliver |
| 2002/0143594 A1 | 10/2002 | Kroeger |
| 2003/0028595 A1 | 2/2003 | Vogt |
| 2003/0036934 A1 | 2/2003 | Ouchi |
| 2003/0041317 A1 | 2/2003 | Sokolov |
| 2003/0097406 A1 | 5/2003 | Stafford |
| 2003/0097410 A1 | 5/2003 | Atkins |
| 2003/0126001 A1 | 7/2003 | Northcutt |
| 2003/0200223 A1 | 10/2003 | Hack |
| 2003/0225598 A1 | 12/2003 | Yu |
| 2003/0233265 A1 | 12/2003 | Lee |
| 2003/0233268 A1 | 12/2003 | Taqbeem |
| 2004/0049696 A1 | 3/2004 | Baker |
| 2004/0083448 A1 | 4/2004 | Schulz |
| 2004/0093290 A1 | 5/2004 | Doss |
| 2004/0093351 A1 | 5/2004 | Lee |
| 2004/0098291 A1 | 5/2004 | Newburn |
| 2004/0125150 A1 | 7/2004 | Adcock |
| 2004/0162833 A1 | 8/2004 | Jones |
| 2004/0187089 A1 | 9/2004 | Schulz |
| 2004/0207249 A1 | 10/2004 | Baumgartner |
| 2004/0230447 A1 | 11/2004 | Schwerin-Wenzel |
| 2004/0268451 A1 | 12/2004 | Robbin |
| 2005/0210394 A1 | 9/2005 | Crandall |
| 2005/0216111 A1 | 9/2005 | Ooshima |
| 2005/0222971 A1 | 10/2005 | Cary |
| 2006/0026256 A1 | 2/2006 | Diddee |

(56) References Cited

U.S. PATENT DOCUMENTS

| | | |
|---|---|---|
| 2006/0028917 A1 | 2/2006 | Wigginton |
| 2006/0047454 A1 | 3/2006 | Tamaki |
| 2006/0085245 A1 | 4/2006 | Takatsuka |
| 2006/0095859 A1 | 5/2006 | Bocking |
| 2006/0136441 A1 | 6/2006 | Fujisaki |
| 2006/0143270 A1 | 6/2006 | Wodtke |
| 2006/0167736 A1 | 7/2006 | Weiss |
| 2006/0190391 A1 | 8/2006 | Cullen, III |
| 2006/0200264 A1 | 9/2006 | Kodama |
| 2006/0218551 A1 | 9/2006 | Berstis |
| 2006/0224430 A1 | 10/2006 | Butt |
| 2006/0277487 A1 | 12/2006 | Poulsen |
| 2007/0016646 A1 | 1/2007 | Tendjoukian |
| 2007/0025567 A1 | 2/2007 | Fehr |
| 2007/0038494 A1 | 2/2007 | Kreitzberg |
| 2007/0041542 A1 | 2/2007 | Schramm |
| 2007/0043821 A1 | 2/2007 | Brumfield |
| 2007/0050225 A1 | 3/2007 | Leslie |
| 2007/0073575 A1 | 3/2007 | Yomogida |
| 2007/0143169 A1 | 6/2007 | Grant |
| 2007/0147178 A1 | 6/2007 | Masuda |
| 2007/0150327 A1 | 6/2007 | Dromgold |
| 2007/0232278 A1 | 10/2007 | May |
| 2007/0255674 A1 | 11/2007 | Mahoney |
| 2007/0255715 A1 | 11/2007 | Li |
| 2007/0260499 A1 | 11/2007 | Greef |
| 2007/0282660 A1 | 12/2007 | Forth |
| 2007/0288283 A1 | 12/2007 | Fitzpatrick |
| 2007/0294344 A1 | 12/2007 | Mohan |
| 2008/0033777 A1 | 2/2008 | Shukoor |
| 2008/0046471 A1 | 2/2008 | Moore |
| 2008/0079730 A1 | 4/2008 | Zhang |
| 2008/0082389 A1 | 4/2008 | Gura |
| 2008/0082956 A1 | 4/2008 | Gura |
| 2008/0091782 A1 | 4/2008 | Jakobson |
| 2008/0120129 A1* | 5/2008 | Seubert ............... G06Q 40/125 705/305 |
| 2008/0126930 A1 | 5/2008 | Scott |
| 2008/0134069 A1 | 6/2008 | Horvitz |
| 2008/0155547 A1 | 6/2008 | Weber |
| 2008/0158023 A1 | 7/2008 | Chung |
| 2008/0167937 A1 | 7/2008 | Coughlin |
| 2008/0175104 A1 | 7/2008 | Grieb |
| 2008/0195964 A1 | 8/2008 | Randell |
| 2008/0209417 A1 | 8/2008 | Jakobson |
| 2008/0221946 A1 | 9/2008 | Balon |
| 2008/0222566 A1 | 9/2008 | Daughtrey |
| 2008/0244582 A1 | 10/2008 | Brown |
| 2008/0268876 A1 | 10/2008 | Gelfand |
| 2008/0270198 A1 | 10/2008 | Graves |
| 2008/0281665 A1 | 11/2008 | Opaluch |
| 2008/0313004 A1 | 12/2008 | Ryan |
| 2009/0048986 A1 | 2/2009 | Anderson |
| 2009/0055796 A1 | 2/2009 | Springborn |
| 2009/0076878 A1 | 3/2009 | Woerner |
| 2009/0089133 A1 | 4/2009 | Johnson |
| 2009/0094623 A1 | 4/2009 | Chakra |
| 2009/0113310 A1 | 4/2009 | Appleyard |
| 2009/0133027 A1 | 5/2009 | Gunning |
| 2009/0167553 A1 | 7/2009 | Hong |
| 2009/0187454 A1 | 7/2009 | Khasin |
| 2009/0199192 A1 | 8/2009 | Laithwaite |
| 2009/0204463 A1 | 8/2009 | Burnett |
| 2009/0204471 A1 | 8/2009 | Elenbaas |
| 2009/0234699 A1 | 9/2009 | Steinglass |
| 2009/0241053 A1 | 9/2009 | Augustine |
| 2009/0260010 A1 | 10/2009 | Burkhart |
| 2009/0287523 A1 | 11/2009 | Lau |
| 2009/0296908 A1 | 12/2009 | Lee |
| 2009/0299803 A1 | 12/2009 | Lakritz |
| 2009/0307319 A1 | 12/2009 | Dholakia |
| 2010/0005087 A1 | 1/2010 | Basco |
| 2010/0070888 A1 | 3/2010 | Watabe |
| 2010/0088137 A1 | 4/2010 | Weiss |
| 2010/0106627 A1 | 4/2010 | O'Sullivan |
| 2010/0114786 A1 | 5/2010 | Aboujaoude |
| 2010/0115523 A1 | 5/2010 | Kuschel |
| 2010/0122334 A1 | 5/2010 | Stanzione |
| 2010/0131860 A1 | 5/2010 | Dehaan |
| 2010/0145801 A1 | 6/2010 | Chekuri |
| 2010/0169146 A1 | 7/2010 | Hoyne |
| 2010/0169802 A1 | 7/2010 | Goldstein |
| 2010/0180212 A1 | 7/2010 | Gingras |
| 2010/0223575 A1 | 9/2010 | Leukart |
| 2010/0269049 A1 | 10/2010 | Fearon |
| 2010/0299171 A1 | 11/2010 | Lau |
| 2010/0312605 A1 | 12/2010 | Mitchell |
| 2010/0313151 A1 | 12/2010 | Wei |
| 2011/0015961 A1 | 1/2011 | Chan |
| 2011/0022662 A1 | 1/2011 | Barber-Mingo |
| 2011/0054968 A1 | 3/2011 | Galaviz |
| 2011/0055177 A1 | 3/2011 | Chakra |
| 2011/0060720 A1 | 3/2011 | Devereux |
| 2011/0071878 A1 | 3/2011 | Gingras |
| 2011/0071893 A1 | 3/2011 | Malhotra |
| 2011/0072372 A1 | 3/2011 | Fritzley |
| 2011/0093538 A1 | 4/2011 | Weir |
| 2011/0093619 A1 | 4/2011 | Nelson |
| 2011/0113365 A1 | 5/2011 | Kimmerly |
| 2011/0154216 A1 | 6/2011 | Aritsuka |
| 2011/0161128 A1 | 6/2011 | Barney |
| 2011/0184768 A1 | 7/2011 | Norton |
| 2011/0270644 A1 | 11/2011 | Roncolato |
| 2011/0307100 A1 | 12/2011 | Schmidtke |
| 2011/0307772 A1 | 12/2011 | Lloyd |
| 2012/0030194 A1 | 2/2012 | Jain |
| 2012/0035942 A1 | 2/2012 | Graupner |
| 2012/0042263 A1* | 2/2012 | Rapaport ............... G06Q 50/01 709/204 |
| 2012/0066030 A1 | 3/2012 | Limpert |
| 2012/0066411 A1 | 3/2012 | Jeide |
| 2012/0072251 A1 | 3/2012 | Mircean |
| 2012/0079449 A1 | 3/2012 | Sanderson |
| 2012/0110087 A1 | 5/2012 | Culver |
| 2012/0117499 A1 | 5/2012 | Mori |
| 2012/0123835 A1 | 5/2012 | Chu |
| 2012/0131191 A1 | 5/2012 | May |
| 2012/0158946 A1 | 6/2012 | Shafiee |
| 2012/0192086 A1 | 7/2012 | Ghods |
| 2012/0221963 A1 | 8/2012 | Motoyama |
| 2012/0239451 A1 | 9/2012 | Caligor |
| 2012/0254218 A1 | 10/2012 | Ali |
| 2012/0266068 A1 | 10/2012 | Ryman |
| 2012/0278388 A1 | 11/2012 | Kleinbart |
| 2012/0296993 A1 | 11/2012 | Heyman |
| 2012/0303614 A1 | 11/2012 | Mercuri |
| 2012/0304187 A1 | 11/2012 | Maresh |
| 2012/0317108 A1 | 12/2012 | Okazaki |
| 2013/0007332 A1 | 1/2013 | Teh |
| 2013/0013560 A1 | 1/2013 | Goldberg |
| 2013/0014023 A1 | 1/2013 | Lee |
| 2013/0018688 A1 | 1/2013 | Nudd |
| 2013/0021629 A1 | 1/2013 | Kurilin |
| 2013/0066944 A1 | 3/2013 | Laredo |
| 2013/0067375 A1 | 3/2013 | Kim |
| 2013/0067549 A1 | 3/2013 | Caldwell |
| 2013/0073328 A1 | 3/2013 | Ehrler |
| 2013/0103412 A1 | 4/2013 | Nudd |
| 2013/0124638 A1 | 5/2013 | Barreto |
| 2013/0151421 A1 | 6/2013 | Van Der Ploeg |
| 2013/0151604 A1 | 6/2013 | Ranade |
| 2013/0173486 A1 | 7/2013 | Peters |
| 2013/0179208 A1 | 7/2013 | Chung |
| 2013/0179799 A1 | 7/2013 | Savage |
| 2013/0185361 A1 | 7/2013 | Balasubramanian |
| 2013/0198618 A1 | 8/2013 | Tanzer |
| 2013/0215116 A1 | 8/2013 | Siddique |
| 2013/0227007 A1 | 8/2013 | Savage |
| 2013/0246110 A1 | 9/2013 | Nakhayi Ashtiani |
| 2013/0246399 A1 | 9/2013 | Schneider |
| 2013/0275229 A1 | 10/2013 | Moganti |
| 2013/0275519 A1 | 10/2013 | Nichols |
| 2013/0279685 A1 | 10/2013 | Kohler |
| 2013/0317871 A1 | 11/2013 | Kulkarni |

(56) References Cited

U.S. PATENT DOCUMENTS

| | | |
|---|---|---|
| 2013/0321467 A1 | 12/2013 | Tappen |
| 2013/0339099 A1 | 12/2013 | Aidroos |
| 2013/0339831 A1 | 12/2013 | Gulanikar |
| 2014/0007005 A1 | 1/2014 | Libin |
| 2014/0012603 A1 | 1/2014 | Scanlon |
| 2014/0025767 A1 | 1/2014 | De Kezel |
| 2014/0036639 A1 | 2/2014 | Taber |
| 2014/0040780 A1 | 2/2014 | Artzt |
| 2014/0040905 A1 | 2/2014 | Tadanobu |
| 2014/0058801 A1 | 2/2014 | Deodhar |
| 2014/0059910 A1 | 3/2014 | Norton |
| 2014/0074536 A1 | 3/2014 | Meushar |
| 2014/0089719 A1 | 3/2014 | Daum |
| 2014/0101310 A1 | 4/2014 | Savage |
| 2014/0156539 A1 | 6/2014 | Brunet |
| 2014/0165001 A1 | 6/2014 | Shapiro |
| 2014/0172478 A1 | 6/2014 | Vadasz |
| 2014/0189017 A1 | 7/2014 | Prakash |
| 2014/0200944 A1 | 7/2014 | Henriksen |
| 2014/0208325 A1 | 7/2014 | Chen |
| 2014/0215344 A1 | 7/2014 | Ligman |
| 2014/0229609 A1 | 8/2014 | Wong |
| 2014/0236663 A1 | 8/2014 | Smith |
| 2014/0244334 A1 | 8/2014 | De |
| 2014/0257894 A1 | 9/2014 | Melahn |
| 2014/0279294 A1 | 9/2014 | Field-Darragh |
| 2014/0288987 A1 | 9/2014 | Liu |
| 2014/0310047 A1 | 10/2014 | De |
| 2014/0310051 A1 | 10/2014 | Meng |
| 2014/0350997 A1 | 11/2014 | Holm |
| 2014/0364987 A1 | 12/2014 | Shikano |
| 2015/0006448 A1 | 1/2015 | Gupta |
| 2015/0007058 A1 | 1/2015 | Wooten |
| 2015/0012330 A1 | 1/2015 | Sugiura |
| 2015/0052437 A1 | 2/2015 | Crawford |
| 2015/0058053 A1 | 2/2015 | De |
| 2015/0113540 A1 | 4/2015 | Rabinovici |
| 2015/0134393 A1 | 5/2015 | De |
| 2015/0153906 A1 | 6/2015 | Liao |
| 2015/0213411 A1 | 7/2015 | Swanson |
| 2015/0215256 A1 | 7/2015 | Ghafourifar |
| 2015/0262111 A1 | 9/2015 | Yu |
| 2015/0312375 A1 | 10/2015 | Valey |
| 2015/0317595 A1 | 11/2015 | De |
| 2015/0339006 A1 | 11/2015 | Chaland |
| 2015/0363092 A1 | 12/2015 | Morton |
| 2015/0363733 A1 | 12/2015 | Brown |
| 2015/0379472 A1 | 12/2015 | Gilmour |
| 2016/0012368 A1 | 1/2016 | O'Connell |
| 2016/0048408 A1 | 2/2016 | Madhu |
| 2016/0048786 A1 | 2/2016 | Fukuda |
| 2016/0063192 A1 | 3/2016 | Johnson |
| 2016/0063449 A1 | 3/2016 | Duggan |
| 2016/0072750 A1 | 3/2016 | Kass |
| 2016/0110670 A1 | 4/2016 | Chatterjee |
| 2016/0124775 A1 | 5/2016 | Ashtiani |
| 2016/0140474 A1 | 5/2016 | Vekker |
| 2016/0140501 A1 | 5/2016 | Figlin |
| 2016/0147773 A1 | 5/2016 | Smith |
| 2016/0147846 A1 | 5/2016 | Smith |
| 2016/0148157 A1 | 5/2016 | Walia |
| 2016/0180277 A1 | 6/2016 | Skiba |
| 2016/0180298 A1 | 6/2016 | McClement |
| 2016/0182311 A1 | 6/2016 | Borna |
| 2016/0188145 A1 | 6/2016 | Gabor |
| 2016/0216854 A1 | 7/2016 | McClellan |
| 2016/0224939 A1 | 8/2016 | Chen |
| 2016/0234391 A1 | 8/2016 | Wolthuis |
| 2016/0275436 A1 | 9/2016 | Kurjanowicz |
| 2016/0313934 A1 | 10/2016 | Isherwood |
| 2016/0328217 A1 | 11/2016 | Hagerty |
| 2016/0337213 A1 | 11/2016 | Deutsch |
| 2016/0342927 A1 | 11/2016 | Reznik |
| 2016/0350689 A1 | 12/2016 | Baek |
| 2016/0380927 A1 | 12/2016 | Vaughn |
| 2017/0004213 A1 | 1/2017 | Cunico |
| 2017/0009387 A1 | 1/2017 | Ge |
| 2017/0017364 A1 | 1/2017 | Kekki |
| 2017/0017924 A1 | 1/2017 | Kashiwagi |
| 2017/0034226 A1 | 2/2017 | Bostick |
| 2017/0039503 A1 | 2/2017 | Jones |
| 2017/0061341 A1 | 3/2017 | Haas |
| 2017/0068933 A1 | 3/2017 | Norton |
| 2017/0093874 A1 | 3/2017 | Uthe |
| 2017/0099296 A1 | 4/2017 | Fisher |
| 2017/0103369 A1 | 4/2017 | Thompson |
| 2017/0116552 A1 | 4/2017 | Deodhar |
| 2017/0132200 A1 | 5/2017 | Noland |
| 2017/0140318 A1 | 5/2017 | Platakis |
| 2017/0153799 A1 | 6/2017 | Hoyer |
| 2017/0154024 A1 | 6/2017 | Subramanya |
| 2017/0177671 A1 | 6/2017 | Allgaier |
| 2017/0185592 A1 | 6/2017 | Frei |
| 2017/0187868 A1 | 6/2017 | Katai |
| 2017/0192642 A1 | 7/2017 | Fishman |
| 2017/0206217 A1 | 7/2017 | Deshpande |
| 2017/0235848 A1* | 8/2017 | Van Dusen ......... G06Q 10/101 705/12 |
| 2017/0249577 A1 | 8/2017 | Nishikawa |
| 2017/0289073 A1* | 10/2017 | Crusson ............... G06F 3/0482 |
| 2017/0316367 A1 | 11/2017 | Candito |
| 2017/0317898 A1 | 11/2017 | Candito |
| 2017/0323233 A1 | 11/2017 | Bencke |
| 2017/0323267 A1 | 11/2017 | Baek |
| 2017/0323350 A1 | 11/2017 | Laderer |
| 2017/0344754 A1 | 11/2017 | Kumar |
| 2017/0346861 A1 | 11/2017 | Pearl |
| 2017/0351385 A1 | 12/2017 | Ertmann |
| 2018/0032524 A1 | 2/2018 | Byron |
| 2018/0052943 A1 | 2/2018 | Hui |
| 2018/0053127 A1 | 2/2018 | Boileau |
| 2018/0054720 A1 | 2/2018 | Messenger |
| 2018/0059910 A1 | 3/2018 | Wooten |
| 2018/0060785 A1 | 3/2018 | Carnevale |
| 2018/0060818 A1 | 3/2018 | Ishiyama |
| 2018/0063063 A1 | 3/2018 | Yan |
| 2018/0068271 A1 | 3/2018 | Abebe |
| 2018/0075387 A1 | 3/2018 | Kulkarni |
| 2018/0083909 A1 | 3/2018 | Barker |
| 2018/0088754 A1 | 3/2018 | Psenka |
| 2018/0089625 A1 | 3/2018 | Rosati |
| 2018/0095938 A1 | 4/2018 | Monte |
| 2018/0102989 A1 | 4/2018 | Borsutsky |
| 2018/0131649 A1 | 5/2018 | Ma |
| 2018/0157477 A1 | 6/2018 | Johnson |
| 2018/0165610 A1 | 6/2018 | Dumant |
| 2018/0173386 A1 | 6/2018 | Adika |
| 2018/0189706 A1 | 7/2018 | Newhouse |
| 2018/0189734 A1 | 7/2018 | Newhouse |
| 2018/0189736 A1 | 7/2018 | Guo |
| 2018/0205797 A1 | 7/2018 | Faulkner |
| 2018/0225795 A1 | 8/2018 | Napoli |
| 2018/0226069 A1 | 8/2018 | Fleischman |
| 2018/0247352 A1 | 8/2018 | Rogers |
| 2018/0247549 A1* | 8/2018 | Martin ................. G09B 19/00 |
| 2018/0255180 A1* | 9/2018 | Goldberg ............. G06F 40/279 |
| 2018/0260081 A1 | 9/2018 | Beaudoin |
| 2018/0262620 A1 | 9/2018 | Wolthuis |
| 2018/0285471 A1 | 10/2018 | Hao |
| 2018/0295079 A1* | 10/2018 | Longo ................... H04L 51/10 |
| 2018/0302357 A1 | 10/2018 | Cohen |
| 2018/0316636 A1 | 11/2018 | Kamat |
| 2018/0331842 A1 | 11/2018 | Faulkner |
| 2018/0357049 A1 | 12/2018 | Epstein |
| 2018/0367477 A1 | 12/2018 | Hariram |
| 2018/0367483 A1 | 12/2018 | Rodriguez |
| 2018/0373804 A1 | 12/2018 | Zhang |
| 2019/0005048 A1 | 1/2019 | Crivello |
| 2019/0007228 A1 | 1/2019 | Vuskovic |
| 2019/0014070 A1 | 1/2019 | Mertvetsov |
| 2019/0018552 A1 | 1/2019 | Bloy |
| 2019/0034057 A1 | 1/2019 | Rudchenko |
| 2019/0068390 A1 | 2/2019 | Gross |
| 2019/0079909 A1 | 3/2019 | Purandare |

(56) References Cited

U.S. PATENT DOCUMENTS

| | | |
|---|---|---|
| 2019/0080289 A1 | 3/2019 | Kreitler |
| 2019/0095839 A1 | 3/2019 | Itabayashi |
| 2019/0095846 A1 | 3/2019 | Gupta |
| 2019/0102700 A1 | 4/2019 | Babu |
| 2019/0138583 A1 | 5/2019 | Silk |
| 2019/0138589 A1 | 5/2019 | Udell |
| 2019/0138961 A1 | 5/2019 | Santiago |
| 2019/0139004 A1 | 5/2019 | Vukovic |
| 2019/0147386 A1 | 5/2019 | Balakrishna |
| 2019/0187987 A1 | 6/2019 | Fauchère |
| 2019/0213509 A1 | 7/2019 | Burleson |
| 2019/0245820 A1 | 8/2019 | Grochocki, Jr. |
| 2019/0265821 A1 | 8/2019 | Pearl |
| 2019/0288965 A1 | 9/2019 | Qiu |
| 2019/0340296 A1 | 11/2019 | Cunico |
| 2019/0340574 A1 | 11/2019 | Ekambaram |
| 2019/0347094 A1 | 11/2019 | Sullivan |
| 2019/0347126 A1 | 11/2019 | Bhandari |
| 2019/0370320 A1 | 12/2019 | Kalra |
| 2020/0019907 A1 | 1/2020 | Notani |
| 2020/0059539 A1 | 2/2020 | Wang |
| 2020/0065736 A1 | 2/2020 | Relangi |
| 2020/0162315 A1 | 5/2020 | Siddiqi |
| 2020/0192538 A1 | 6/2020 | Karpe |
| 2020/0192908 A1 | 6/2020 | Smith |
| 2020/0193556 A1 | 6/2020 | Jin |
| 2020/0218551 A1 | 7/2020 | Sabo |
| 2020/0228474 A1 | 7/2020 | Cameron |
| 2020/0233879 A1 | 7/2020 | Papanicolaou |
| 2020/0244611 A1 | 7/2020 | Rosenstein |
| 2020/0328906 A1 | 10/2020 | Raghavan |
| 2020/0344253 A1 | 10/2020 | Kurup |
| 2021/0004380 A1 | 1/2021 | Koch |
| 2021/0004381 A1 | 1/2021 | Smith |
| 2021/0097466 A1 | 4/2021 | Sabo |
| 2021/0103451 A1 | 4/2021 | Sabo |
| 2021/0110347 A1 | 4/2021 | Khalil |
| 2021/0136012 A1 | 5/2021 | Barbitta |
| 2021/0182475 A1 | 6/2021 | Pelz |
| 2021/0216562 A1 | 7/2021 | Smith |
| 2021/0232282 A1 | 7/2021 | Karpe |
| 2021/0320891 A1 | 10/2021 | Rosenstein |
| 2021/0342785 A1 | 11/2021 | Mann |
| 2021/0342786 A1 | 11/2021 | Jiang |
| 2021/0382734 A1 | 12/2021 | Rosenstein |
| 2022/0019320 A1 | 1/2022 | Sabo |
| 2022/0058548 A1 | 2/2022 | Garg |
| 2022/0075792 A1 | 3/2022 | Koch |
| 2022/0078142 A1 | 3/2022 | Cameron |
| 2022/0158859 A1 | 5/2022 | Raghavan |
| 2023/0075835 A1 | 3/2023 | Sabo |
| 2023/0239261 A1 | 7/2023 | David |

FOREIGN PATENT DOCUMENTS

| | | | | |
|---|---|---|---|---|
| CN | 102378975 B | | 5/2015 | |
| CN | 103534685 B | * | 11/2016 | ............ G06Q 10/06 |
| CN | 106228451 A | * | 12/2016 | |
| CN | 109104587 A | * | 12/2018 | ............ G06F 3/011 |
| CN | 109428859 A | * | 3/2019 | ............ H04L 51/10 |
| CN | 109428859 A | | 3/2019 | |
| WO | 2004047465 A2 | | 6/2004 | |
| WO | 2015036817 A1 | | 3/2015 | |
| WO | 2015123751 A1 | | 8/2015 | |
| WO | WO-2016068852 A1 | * | 5/2016 | ....... G06F 17/30539 |
| WO | 2018204841 A1 | | 11/2018 | |
| WO | 2019079826 A1 | | 4/2019 | |
| WO | 2020006634 A1 | | 1/2020 | |

OTHER PUBLICATIONS

Jacob Crandall, "Validating Human-Robot Interaction Schemes in Multitasking Environments," 2005, IEEE Transactions on Systems, Man, and Cybernetics, part A, vol. 35, No. 4, pp. 438-449. (Year: 2005).*

Harshada Patel, "Factors of Collaborative working: A framework for a collaboration model," 2012, Applied Ergonomics 43, pp. 1-26 (Year: 2012).*

"U.S. Appl. No. 14/584,750, Examiner Interview Summary mailed Feb. 25, 2016", 3 pgs.

"U.S. Appl. No. 14/584,750, Non Final Office Action mailed Aug. 28, 2015", 21 pgs.

"U.S. Appl. No. 14/584,750, Notice of Allowance mailed Mar. 28, 2016", 8 pgs.

"U.S. Appl. No. 14/584,750, Response filed Feb. 29, 2015 to Non Final Office Action mailed Aug. 28, 2015", 16 pgs.

"U.S. Appl. No. 14/584,850, Final Office Action mailed Sep. 1, 2017", 31 pgs.

"U.S. Appl. No. 14/584,850, Non Final Office Action mailed Jan. 10, 2017", 9 pgs.

"U.S. Appl. No. 14/584,850, Response filed Apr. 10, 2017 to Non Final Office Action mailed Jan. 10, 2017", 13 pgs.

"How to Asana: Inviting teammates to Asana." YouTube, Asana, Mar. 21, 2017, https://www.youtube.com/watch?v=TLOruY1KyxU ( Year: 2017), 13 pages.

"Rules of Data Conversion from Document to Relational Databases", published: 2014, publisher: Future-processing, pp. 1-8 (Year: 2014).

Tiburca, Andrew) Best Team Calendar Applications for 2018-Toggl https://toggl.com/blog/best-team-calendar-applications-for-2018 (Year: 2017) 3 pages.

Asana Demo and Product Tour, you tube excerpt, Dec. 7, 2017 https://www.youtube.com/watch?v=IMAFWVLGFyw (Year: 2017) (16 pages).

Asana integrations, Asana tutorial, youtube, excerpt, Nov. 16, 2016 https://www.youtube.com/watch?v=hBiQ7DJNinE (Year: 2016) (21 pages).

Asana Workload and Portfolios, youtube, excerpt, Aug. 1, 2019 https://www.youtube.com/watch?v=7XkNcfFDG6M (Year: 2019) (20 pages).

Asana YouTube channel, list of all product videos, Nov. 19, 2014-Aug. 19, 2019 https://www.youtube.com/user/AsanaTeam/videos?disable_polymer=1 (Year: 2019) (5 pages).

Asana, Task dependencies, archives org, Aug. 25, 2017 https://web.archive.org/web/20170825002141/https://asana.com/guide/help/tasks/dependencies (Year: 2017) (5 pages).

Asana,Manage your team capacity with Workload, youtube, excerpt, Aug. 1, 2019 https://www.youtube.com/watch?v=2ufXyZDzZnA &list=PLJFG93oi0wJAi UwyOhIGWHdtJzJrzyIBv (Year: 2019) (1 page).

Assef, F., Cassius, T. S., & Maria, T. S. (2018). Confrontation between techniques of time measurement. Journal of Manufacturing Technology Management, 29(5), 789-810. (Year: 2018).

Biggs, "GateGuru Relaunches With New Ways to Streamline Your Travel Experience", Techcrunch, (Apr. 26, 2013), 3 pgs.

Castaneda Samuel, Introduction Manual—Asana, Sep. 25, 2017 https://static1.squarespace.com/static/586d532ae58c6232db243a65/t/5c210c10f950b7fc7a8e3274/1545669658049/Asana+Manual.pdf (Year: 2017) (20 pages).

Command and control, wikipedia, archives org, Mar. 16, 2018 https://web.archive.org/web/20180316193655/https://en.wikipedia.org/wiki/Command_and_control (Year: 2018), 6 pages.

Creating Tables with Fields from 2 Different Tables, published: 2009, publisher: StackOverflow, pp. 1-2. (Year: 2009).

Critical chain project management, Wikipedia, archives org, Dec. 17, 2016 https://web.archive.Org/web/20161217090326/https://en.wikipedia.org/wiki/Critical_chain_project_management (Year: 2016) 5 pages.

Critical Path Method, Wikipedia, archives org, Sep. 19, 2017 https://web.archive.Org/web/20170919223814/https://en.wikipedia.org/wiki/Critical_path_method (Year: 2017) 6 pages.

Dawei Li, "Deepcham: Collaborative Edge-Mediated Adaptive Deep Learning for Mobile Object Recognition", 2016, IEEE/ACM, pp. 64-76. (Year: 2016).

(56) References Cited

OTHER PUBLICATIONS

Fruhlinger, Joshua. "The Best To-Do ListApps for Feeling Productive; With the right app, feeling productive can be just as gratifying as actually getting things done" Wall Street Journal (Online); New York, N.Y. [New York, N.Y]Nov. 8, 2013 (Year: 2013) 4 pages.
Hartmann, "TimeProjectscheduling with resource capacities and requests varying with time: a case study," 2013, Flexible services and manufacturing journal, vol. 25, No. 1, pp. 74-93 (Year: 2013).
Helen Mongan-Rallis & Terrie Shannon, "Synchronous Chat," Aug. 2016, Dept. of Education, Univ. of MN Duluth, web.archive.org/web/20160825183503/https://www.d.umn.edu/hrallis/professional/presentations/cotfsp06/indiv_tools/sync_chat.htm (Year: 2016) (2 pages).
How to Asana Asana time tracking, youtube, excerpt, May 24, 2017 https://www.youtube.com/watch?v=z91qlex-TLc (Year: 2017) (1 page).
How to Asana, Asana project management, youtube, excerpt, Mar. 7, 2017 https://www.youtube.com/watch?v=qqANMTvVpE (Year: 2017) (28 pages).
How to Asana, Creating your first Asana project, youtube, excerpt, Jan. 31, 2017 https://www.youtube.com/watch?v=L04WmcUdsLo (Year: 2017) (1 page).
How to Asana, Getting Asana into your workflow, youtube, excerpt, Jul. 17, 2017 https://www.youtube.com/watch?v=7YLrNMdv30 (Year: 2017) (24 pages).
How to Asana, Planning with Asana calendar, youtube excerpt, Feb. 14, 2017 https://www.youtube.com/watch?v=w8t6KYiVPyc (Year: 2017) (19 pages).
How to Asana, Using Asana for task management, youtube, excerpt, Feb. 7, 2017 https://www.youtube.com/watch?v=vwvbgiejhQ (Year: 2017) (8 pages).
How to Asana, Visualizing work with Asana kanban boards, youtube, excerpt, Feb. 21, 2017 https://www.youtube.com/watch?v=jmZaZGydfPY (Year: 2017) (41 pages).
How to Asana, Workflow management, youtube, excerpt, May 30, 2017 https://www.youtube.com/watch?v=rk8nPWmXsRo (Year: 2017) (9 pages).
How to use Advanced Search in Asana, Asana tutorial, May 25, 2016 https://www.youtube.com/watch?v=5VyJ3toPfQM (Year: 2016) (28 pages).
ip.com,A Method to Eliminate Unnecessary IM Messages, Jun. 10, 2008, IMCOM000171454D, 3 pages.
Jacob Crandall, "Validating Human Robot Interaction Schemes in Multitasking Environments," 2005, IEEE Transactions on Systems Man, and Cybernetics, Part A, Systems and Humans, vol. 35, No. 4, pp. 438-449. (Year: 2005).
Jeronimo G. Grandi, "Characterizing Asymmetric Collaborative Interactions in Virtual and Augmented Realities," 2019, IEEE Conference on Virtual Reality, pp. 127-135. (Year: 2019).
Justin Rosenstein, Unveiling the Future of Asana, Mar. 28, 2018 https://www.youtube.com/watch?v=nRI?d_WM4Bc (Year: 2018) (2 pages).
Lauren Labrecque, "Fostering Consumer-Brand Relationships in Social Media Environments: The Role of Parasocial Interaction", 2014, Journal of Interactive Markeing, 28 (2014), pp. 134-148 (Year: 2014).
Macro, computer science, wikipedia, archives org, 6 pages, Feb. 11, 2020 http://web.archive.org/web/20200211082902/https://en.wikipedia.org/wiki/Macro_(computer_science) (Year: 2020) 6 pages.
Mauricio Aizawa, Zapier, How to Automate Asana Tasks creation using Evernote, youtube excerpts, Mar. 16, 2018 https://www.youtube.com/watch?v=BjDQ4Gny4WI (Year: 2018) (8 pages).
Paul Minors, How to automate your tasks, youtube excerpts, Oct. 18, 2019 https://www.youtube.com/watch?v=lwF9XyUQrzw (Year: 2019).
Prioritize My Tasks in Asana, Asana tutorial, youtube, excerpt, May 25, 2016 https://www.youtube.com/watch?v=UbCnMvw01nl (Year: 2016) (3 pages).
Project views, Asana tutorial, youtube, excerpt May 25, 2016 https://www.youtube.com/watch?v=FYjA8ZH3ceQ (Year: 2016) (5 pages).
Using Asana Premium, Asana tutorial, youtube, excerpt, Sep. 10, 2016 https://www.youtube.com/watch?v=vMgLtDDmyeo (Year: 2016) (4 pages).
Where does Asana fit in, archives org, Jul. 8, 2017 https://web.archive.org/web/20170708150928/https://asana.com/guide/resources/infosheets/where-does-asana-fit (Year: 2017) (5 pages).
Wikipedia entry for AIM (software), archived Sep. 29, 2019, 10 pages.
Wix.com, How to Use Wix Code with Marketing Tools to Create Custom Events, Oct. 18, 2018, YouTube, https://www.youtube.com/watch?v=MTBVykOYGvO&feature=emb_title, 2 pages.
www.asana.com (as retrieved from https://web.archive.Org/web/20160101054536/https://asana.com/press and https://web.archive.org/web/20160101054527/https://asana.com/product) (Year: 2016) 15 pages.
www.cogmotive.com/blog/author/alan Alan Byrne: "Creating a company Shared Calendar in Office 365"; pp. 1-17; Sep. 10, 2013 (16 pages).
Yoon-Eui Nahm, "Integrated Product and Process Modeling for Collaborative Design Environment," Mar. 2004, Concurrent Engineering: Research and Applications, pp. 5-23. (Year: 2004).

\* cited by examiner

SYSTEMS AND METHODS TO PROVIDE MEASURES OF USER WORKLOAD WHEN GENERATING UNITS OF WORK BASED ON CHAT SESSIONS BETWEEN USERS OF A COLLABORATION ENVIRONMENT

FIELD OF THE DISCLOSURE

The present disclosure relates to systems and methods to provide measures of user workload when generating units of work based on chat sessions between users of a collaboration environment.

BACKGROUND

Some work management platforms providing collaboration environments typically require users to manually input to-do items and/or units of work. Without such manual input, computers generally cannot generate and/or manage units of work for users automatically. This creates more work for users and reduces user efficiency. As such, users and companies waste valuable resources and may be unlikely to use a work management platform long term.

SUMMARY

One aspect of the present disclosure relates to a system configured to provide measures of user workload when generating units of work based on chat sessions between users of a collaboration environment. One or more units of work to be generated may be determined dynamically in a chat session through a graphical chat interface and/or based on content from the chat session through the graphical chat interface. The users of the chat session may provide specific input to generate the one or more units of work. The one or more units of work to be generated may include one or more assignees (e.g., users to whom the one or more units of work are assigned). To aid the users of the chat session in making an appropriate selection of an assignee, the graphical user interface may include a workload display pane providing visual representation of workload of one or more potential assignees. The visual representation may provide the users of the chat session with information about which potential assignee may be more equipped to handle the one or more units of work. Therefore, the users of the chat session may be able to make an informed decision about assignee designation at the onset of the generation of the one or more units of work. This may help to eliminate a later possibility of having to reassign a unit of work due to an assignee being overloaded with work.

In some implementations, potential assignees and/or other users may be linked to one or more units of work in the collaboration environment. A unit of work may be linked with a user in a manner that defines one or more relationships between the user and the unit of work. Such a relationship may connote and/or be a result of an action (past, present, and/or future) of the user with respect to the unit of work. Such actions may include one or more of creating a work unit record for a unit of work, being assigned to participate in a unit of work, participating in a unit of work, being granted access to a work unit record of a unit of work, adjusting a value of a parameter of a work unit record of a unit of work, and/or other actions.

One or more implementations of a system configured to provide measures of user workload when generating units of work based on chat sessions between users of a collaboration environment may include one or more hardware processors configured by machine-readable instructions, and/or other components. The processor(s) may be configured to manage environment state information maintaining a collaboration environment. The collaboration environment may be configured to facilitate interaction by users with the collaboration environment. The environment state information may include one or more of user records, work unit records, other records, and/or other information. The user records may include values of user parameters of the users and/or other information. The user parameters may include a workload parameter characterizing workload of the users and/or other parameters. The work unit records may describe units of work assigned to, created by, and/or managed by individual users within the collaboration environment.

The processor(s) may be configured to obtain content information characterizing content of chat sessions between the users of the collaboration environment. The chat sessions may facilitate synchronous, semi-synchronous, and/or asynchronous communication between the users. By way of non-limiting illustration, the chat sessions may include a first chat session between a first user, a second user, and/or other users. By way of non-limiting illustration, first content information characterizing first content of the first chat session may be obtained.

The processor(s) may be configured to identify potential units of work to be generated for one or more of users based on the content from the chat sessions and/or other information. By way of non-limiting illustration, a first potential unit of work may be identified based on the first content information characterizing the first content of the first chat session.

The processor(s) may be configured to identify potential assignees of the potential units of work based on the content from the chat sessions and/or other information. By way of non-limiting illustration, a third user, a fourth user, and/or other users may be identified as potential assignees of the first potential unit of work based on the first content information characterizing the first content of the first chat session and/or other information.

The processor(s) may be configured to obtain the user records of the one or more potential assignees. Obtaining the user records may include obtaining the values of the workload parameters of the potential assignees, and/or other information. By way of non-limiting illustration, a first user record for the third user, a second user record for the fourth user, and/or other user records may be obtained. The first user record may include a first set of values for the workload parameter of the third user. The second user record may include a second set of values for the workload parameter of the fourth user.

The processor(s) may be configured to generate views of a workload display pane in graphical user interfaces of the chat sessions. The workload display pane may provide visual representation of the values of the workload parameter of the potential assignees. By way of non-limiting illustration, a view of a first workload display page may be generated in the graphical user interfaces of the first chat session. The first workload display pane may provide the visual representation of the first set of values for the workload parameter of the third user, the second set of values for the workload parameter of the fourth user, and/or other values for other users.

As used herein, any association (or relation, or reflection, or indication, or correspondency) involving servers, processors, client computing platforms, and/or another entity or object that interacts with any part of the system and/or plays a part in the operation of the system, may be a one-to-one association, a one-to-many association, a many-to-one association, and/or a many-to-many association or N-to-M association (note that N and M may be different numbers greater than 1).

As used herein, the term "obtain" (and derivatives thereof) may include active and/or passive retrieval, determination, derivation, transfer, upload, download, submission, and/or exchange of information, and/or any combination thereof. As used herein, the term "effectuate" (and derivatives thereof) may include active and/or passive causation of any effect. As used herein, the term "determine" (and derivatives thereof) may include measure, calculate, compute, estimate, approximate, generate, and/or otherwise derive, and/or any combination thereof.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
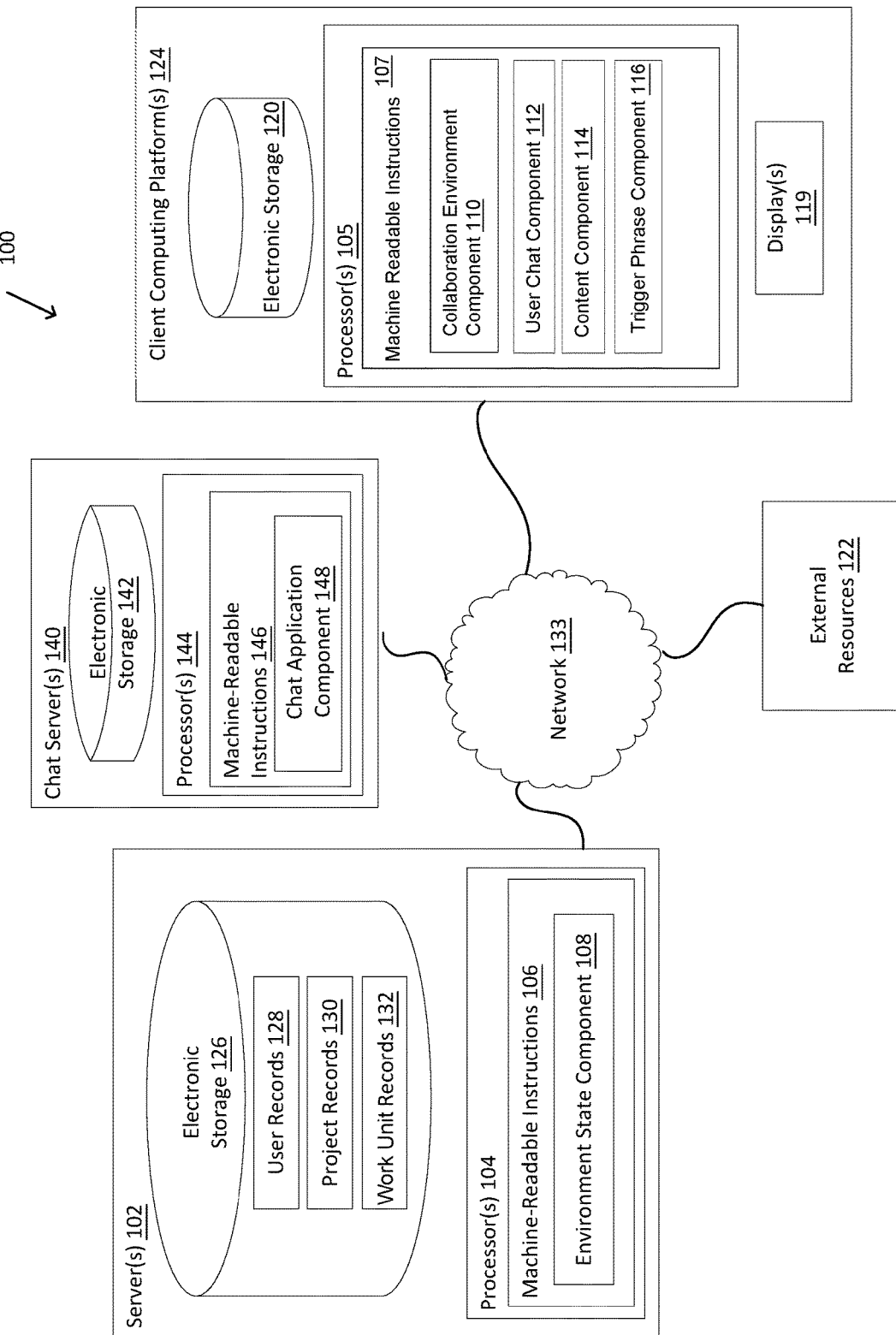
FIG. 1 illustrates a system configured to provide measures of user workload when generating units of work based on chat sessions between users of a collaboration environment, in accordance with one or more implementations.

Generating units of work based on chat sessions between users of within a collaboration environment may enable generation of units of work based on synchronous, semi-synchronous, and/or asynchronous communications between multiple users. One or more units of work to be generated may be determined dynamically in a chat session through the graphical chat interface and/or based on content from the chat session through the graphical chat interface. One or more potential assignees of the one or more units of work to be generated may be determined dynamically in a chat session through the graphical chat interface and/or based on content from the chat session through the graphical chat interface. To aid the users of the chat session in making an appropriate selection of an assignee from the one or more potential assignees, the graphical user interface may include a workload display pane providing visual representation of workload of the one or more potential assignees. The visual representation may provide the users of the chat session with information about which potential assignee may be more equipped to handle (e.g., have more time available) the one or more units of work. The one or more units of work may be automatically generated including individual ones of the one or more potential assignees. The one or more potential assignees may be determined in real-time, near-real time, at the end of a given chat session, and/or at any other time during the given chat session. The visualization of workload may be determined and presented in real-time, near-real time, at the end of a given chat session, and/or at any other time during the given chat session. Units of work to be generated may be identified in real-time, near-real time, at the end of a given chat session, and/or at any other time during the given chat session.

The presentation of the collaboration environment may be based on environment state information. The environment state information may include one or more of user records 128, project records 130, work unit records 132, and/or other records. Other records may include objective records (not shown in FIG. 1). The environment state information may be continuously generated and/or updated based on state of the collaboration environment representing the users' interactions with the collaboration environment.

The state of the collaboration environment may include a user state, a project state, a work unit state, and/or other states. The user state may be defined by user records 128. User records 128 may define user information associated with users interacting with and/or viewing the collaboration environment. The project state may be defined by project records 130. Project records 130 may define project information for projects managed within the collaboration environment. Objective records may define objective information for business objectives. Managing may include one or more of obtaining, defining, storing, updating, deleting, and/or other operations. The work unit state may be defined by work unit records 132. Work unit records 132 may define work information for units of work created, managed, and/or assigned within the collaboration environment.

The projects may be associated with a set of units of work that may directly facilitate progress toward fulfillment of the project. The set of units of work may directly contribute to the progress. The business objectives may be associated with a set of units of work that may indirectly facilitate progress toward fulfillment of the business objectives. The set of units of work may not directly contribute to the progress of the business objectives. By way of non-limiting illustration, a connection between the set of units of work and a corresponding business objective may be indirect in that completion of at least one of the units of work may have no direct impact on progress toward fulfillment of the business objective. The concept of "no direct impact" may mean that completion of the at least one unit of work may not cause progress toward fulfillment of the business objective without independent action outside of the at least one unit of work. Instead, the fulfillment of the at least one business objective may make such independent action more likely (e.g., through coercion, assistance, education, incentivization, reminder, etc.). However, in some implementations, business objectives may be associated with a set of units of work that may directly facilitate progress toward fulfillment of the business objectives. Accordingly, completion of the set of units of work may directly contribute to the progress toward fulfillment.

In some implementations, units of work created by, assigned to, and/or completed by the users may refer generally to a linking of the units of work with the individual users in the collaboration environment. A unit of work may be linked with a user in a manner that defines one or more relationships between the user and the unit of work. Such a relationship may connote and/or be a result of an action (past, present, and/or future) of the user with respect to the unit of work. Such actions may include one or more of creating a work unit record for a unit of work, being assigned to participate in a unit of work, participating in a unit of work, being granted access to a work unit record of a unit of work, adjusting a value of a parameter of a work unit record of a unit of work, and/or other actions.

As is illustrated in FIG. 1, system 100 may include one or more of: one or more servers 102, one or more chat servers 140, one or more client computing platforms 124, external resource(s) 122, and/or other components. Users may interact with system 100 via one or more client computing platforms 124. The one or more servers 102 and/or chat server(s) 140 may be configured to communicate with one or more client computing platforms 124 according to a client/server architecture and/or other communication schemes. The one or more client computing platforms 124 may include one or more of a cellular telephone, a smartphone, a digital camera, a laptop, a tablet computer, a desktop computer, a television set-top box, smart TV, a gaming console, and/or other client computing platforms.

The one or more servers 102 may include one or more of one or more physical processors 104, non-transitory electronic storage 126, and/or other components. Non-transitory electronic storage 126 may include one or more records. The records may include user records 128, project records 130, work unit records 132, and/or other records. The one or more physical processors 104 may be configured to access one or more of the records to effectuate transmission of the environment state information over network 133 to client computing platform(s) 124.

The chat server(s) 140 may include one or more of one or more physical processors 144, non-transitory electronic storage 142, and/or other components.

The client computing platform(s) 124 may include one or more physical processors 105, non-transitory electronic storage 120, one or more displays 119, and/or other components. The client computing platform(s) 124 may monitor, and/or collect information for transmission to the one or more server(s) 102 to be stored as environment state information. The client computing platform(s) 124 may obtain and/or collect environment state information from the one or more server(s) 102. Client computing platform(s) 124 may use the environment state information to effectuate presentation of the collaboration environment via client computing platform(s) 124.

The one or more physical processors 104, physical processor(s) 144, and/or physical processors 105 may be configured to execute machine-readable instructions 106, machine-readable instructions 146, and/or machine-readable instructions 107, respectively. Machine-readable instructions may include one or more computer program components. The computer program components may include one or more of an environment state component 108, a chat application component 148, a collaboration environment component 110, a user chat component 112, a content component 114, a trigger phrase component 116, and/or other components.

It is noted that while some computer program components may be shown and described as attributed to an individual one of or more of chat servers(s) 140, client computing platform(s) 124, and/or server(s) 102, this is for illustrative purposes only. Instead, it is to be understand that the features and/or functionality of one of these entities may be additionally and/or alternatively attributed to another one of these entities.

In some implementations, server(s) 102 and/or chat server(s) 140 may be configured to provide remote hosting of the features and/or functions attributed thereto to one or more client computing platform(s) 124 that may be remotely located from server(s) 102 and/or chat server(s) 140. In some implementations, one or more features and/or functions of server(s) 102 and/or chat server(s) 140 may be attributed as local features and/or functions of one or more client computing platform(s) 124. For example, individual ones of the client computing platform(s) 124 may include one or more additional machine-readable instructions comprising the same or similar components as machine-readable instructions 106 of server(s) 102 and/or machine-readable instructions 146 of chat server(s) 140. The client computing platform(s) 124 may be configured to locally execute the one or more components. One or more features and/or functions of machine-readable instructions 106 of server(s) 102 may be provided, at least in part, as an application program that may be executed at a given client computing platform. One or more features and/or functions of machine-readable instructions 107 may be provided, at least in part, at server(s) 102.

The electronic storage 126, electronic storage 142, and/or electronic storage 120 may include electronic storage media that electronically stores information. The electronic storage media of electronic storage 126, electronic storage 142, and/or electronic storage 120 may include one or both of system storage that is provided integrally (i.e., substantially non-removable) and/or removable storage that is removably connected. The connection may be facilitated by, for example, a port (e.g., a USB port, a firewire port, etc.) or a drive (e.g., a disk drive, etc.).

The electronic storage 126, electronic storage 142, and/or electronic storage 120 may individually include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage 126, electronic storage 142, and/or electronic storage 120 may individually include one or more virtual storage resources (e.g., cloud storage, a virtual private network, and/or other virtual storage resources). The electronic storage 126, electronic storage 142, and/or electronic storage 120 may individually store software algorithms, information determined by various entities described herein, and/or other information that enables chat server(s) 140, server(s) 102, and/or client computing platform(s) 124 to function as described herein.

The electronic storage 126 may be configured to store one or more records and/or information. The one or more records may include one or more of user records 128, project records 130, work unit records 132, and/or other records. The one or more records may specify and or define values for one or more user parameters, project parameters, and/or other parameters for the collaboration environment. The one or more records may specify correspondences between one or more of the user records 128, project records 130, work unit records 132, and/or other records. The correspondences may be used to determine which user parameters and/or values, project parameters and/or values, and/or work unit parameters and/or values are associated with a given user, project, and/or unit of work within the collaboration environment.

The user information in user records 128 may include values of user parameters. The values of the user parameters may be organized in the user records corresponding to users interacting with and/or viewing the collaboration environment. The values of the user parameters associated with the users interacting with and/or viewing the collaboration environment may include information describing the users, their actions within the collaboration environment, their settings, and/or other user information; and/or metadata associated with the users, their actions within the environment, their settings, and/or other user information. Individual ones of the users may be associated with individual ones of the user records. A user record may define values of the user parameters associated with a given user interacting with and/or viewing the collaboration environment.

The values of the user parameters may, by way of non-limiting example, specify one or more of: a user name, a group parameter, a user account, a user role information, a user department, descriptive user content, a to-email, a from-email, a photo, an organization, a workspace, one or more projects (which may include project parameters defined by one or more work unit records), one or more items of work (which may include one or more unit of work parameters defined by one or more unit of work records), one or more user comments, one or more teams the user belongs to, one or more of the user display settings (e.g., colors, size, project order, task order, other unit of work order, etc.), one or more authorized applications, one or more interaction parameters (e.g., indicating a user is working on/worked on a given unit of work, a given user viewed a given work unit of work, a given user selected a given unit of work, a timeframe a given user last interacted with and/or worked on a given unit of work, a time period that a given unit of work has been idle, and/or other interaction parameters), a presence parameter (e.g., indicating presence and/or interaction level at an environment level, unit of work level, project level, task level, application level, etc.), one or more notification settings, one or more progress parameters, status information for one or more work units the user is associated with (units of work assigned to the user, assigned to other users by the user, completed by the user, past-due date, and/or other information), one or more performance metrics of a given user (e.g., how many units of work the user has completed, how quickly the user completed the units of work, how quickly the user completes certain types of work units, the efficiency of the user, bandwidth of the user, activity level of the user, etc.), application access information (e.g., username/password for one or more third-party applications), user workload information, one or more favorites and/or priorities, schedule information, and/or other user parameters for the given user.

User role information may specify individual roles of the individual users in the individual units of work. A role may represent a position of an individual user. The position may be specified based on a description of one or more of job title, level, stage, and/or other descriptions of position. The role may be specified with respect to a company as a whole, a particular unit of work, and/or other considerations. By way of non-limiting illustration, a role may include one or more of chief executive officer (or other officer), owner, manager, supervisor, accountant, associate, employee, entry level, midlevel, senior, administrator, director, foreman, engineer, product developer, human resource officer, artist, art director, and/or other description.

Schedule information for the individual users may include one or more calendar entries associated with the individual users. Individual calendar entries may be associated with the individual quantities of units of time to complete the calendar entries. The individual calendar entries may be associated with individual start dates and individual end dates. In some implementations, schedule information may be stored locally within electronic storage 126 by virtue of features and/or functionality provided within a collaboration environment. By way of non-limiting illustration, a collaboration environment may have the features and/or functionality of calendar application configured to facilitate calendaring entries into a schedule. It is noted that schedule information may be determined through features and/or functionality provided by one or more external resources 122. By way of non-limiting illustration, an external resource may include a calendar application which may be external to a collaboration environment. The collaboration environment may have permissions to access the external calendar application to determine and/or obtain schedule information. In some implementations, a calendar application may reside in electronic storage 120 of client computing platform(s) 124.

The user workload information may include values of a workload parameter of a given user. The workload parameter may characterize workload. In some implementations, the workload of a user may be characterized based on quantities of workload. The quantities of workload may be expressed as one or more of quantities of units of work, quantities of units of time, quantities of units of work production, and/or other quantities used to measure workload. The units of time may include one or more of minutes, hours, days, weeks, months, and/or other units of time. The units of work production may include one or more of lines of code, lines of copy, and/or other information. Quantities may be expressed as one or more of a total, an average, an actual, an estimated, and/or other values.

In some implementations, the quantities of workload may be described in relation to a temporal measure. The temporal measure may include one or more units of time. The one or more units of time may include a date range. By way of non-limiting illustration, the one or more units of time may include one or more of an hour, a day, a week, a month, a user-selectable date range, and/or other date ranges. Describing the individual quantities of workload in relation to a date range may include determining individual quantities of workload per unit of time (e.g., hour, day, etc.) for individual units of time falling within the date range. Describing individual quantities of workload on a per day basis may provide a means to express workload of a user on a multi-day basis. As an illustrative example, workload may characterize a quantity of units of work (or other measure) assigned to an individual user over a period of a week (or other temporal measure). The workload may be described based on quantities of workload for individual days in the week. The workload may then be expressed based on one or more of a total quantity of units of work assigned to the user in the period of the work, a change in the quantities of units of work through the days of the week (since workload per day may be determined), and/or other expressions.

In some implementations, the values of the workload parameter may be associated with a visual representation. A visual representation of values of the workload parameter may include one or more of a plot line, a bar chart, a pie graph, and/or other graphical representations. By way of non-limiting illustration, a plot line may be plotted with respect to a date axis, a workload axis, and/or other features. The date axis may show a date range representing a temporal measure. The workload axis may represent quantities of the workload, expressed as one or more of quantities of units of work, quantities of units of time (e.g., hours and/or other units), quantities of units of work production, and/or other quantities used to measure workload. As such, the plot line may show how the workload changes through different dates along the date range. In some implementations, a plot line may be plotted with respect to a threshold which may represent a workload capacity.

The work information in the work unit records 132 may include values of one or more work unit parameters. The values of the work unit parameters may be organized in work unit records corresponding to units of work managed, created, and/or assigned within the collaboration environment. A given unit of work may have one or more assignees and/or team members working on the given unit of work. Units of work may be associated with one or more to-do items, action items, objectives, and/or other units of work one or more users should accomplish and/or plan on accomplishing. Units of work may be created by a given user for the given user and/or created by the given user and assigned to one or more other users. A given unit of work may include one or more of a task, a sub-task, and/or other units of work possibly assigned to and/or associated with one or more users.

Individual sets of work unit records may be defined by a record hierarchy. A record hierarchy may convey individual positions of work unit records (and their corresponding units of work) in the record hierarchy. By way of non-limiting illustration, a position may specify one or more of a work unit record being superior to another work unit record, a work unit record being subordinate to another work unit record, and/or other information. As a result, individual work unit records in the individual sets of work unit records may be subordinate to other individual work unit records in the individual sets of work unit records. For example, a work unit record may define a unit of work comprising a task, and a subordinate work unit record may define unit of work comprising a sub-task to the task. A record hierarchy may define a relationship between work unit records. A work unit record may have some restrictions placed on it by virtue of having a subordinate work unit record. By way of non-limiting illustration, a work unit record may be restricted from access by one or more users unless and/or until a subordinate work unit record is completed and/or started.

Individual work units records may include hierarchical information defining a record hierarchy of the individual work unit records. The hierarchical information of a work unit record may include one or more of information identifying other work unit records associated in a record hierarchy the work unit record belongs to, a specification of the position of the work unit record in the hierarchy, restrictions and/or other relationships placed on the work unit record by virtue of its position, and/or other information.

The one or more work unit parameters may include one or more of a work assignment parameter, a work management parameter, work creation parameter, and/or other parameters. The values of the work assignment parameter may describe units of work assigned to the individual users. The values of the work management parameter may describe units of work managed by the individual users. The values of the work creation parameter may describe units of work created by the individual users.

In some implementations, values of one or more work unit parameters of a given unit of work may describe the unit of work based on one or more of a unit of work name, a unit of work description, one or more unit of work dates (e.g., a start date, a due date, an end date, a completion date, and/or dates), one or more members associated with a unit of work (e.g., an owner, one or more other project/task members, member access information, and/or other unit of work members and/or member information), a status parameter (e.g., an update, a hardcoded status update, a completed/uncomplete/mark complete, a measured status, a progress indication, quantity of sub-work units remaining for a given unit of work, completed units of work in a given project, and/or other status parameter), one or more user comment parameters (e.g., permission for who may comments such as a creator, a recipient, one or more followers, and/or one or more other interested parties; content of the comments; one or more times; presence or absence of the functionality of up-votes; one or more hardcoded responses; and/or other parameters.), one or more interaction parameters (e.g., indicating a given unit of work is being worked on/was worked on, given unit of work was viewed, a given unit of work was selected, how long the given unit of work has been idle, a last interaction parameter indicating when and what user last interacted with the given unit of work, users that interacted with the given unit of work, and/or other interaction parameters indicating sources of the interactions, context of the interactions, content of the interactions and/or time for the interactions), one or more file attachments, notification settings, privacy, an associated URL, one or more interaction parameters (e.g., sources of the interactions, context of the interactions, content of the interactions, time for the interactions, and/or other interaction parameters), updates, ordering of units of work within a given unit of work (e.g., tasks within a project, subtasks within a task, etc.), state of a workspace for a given unit of work (e.g., application state parameters, application status, application interactions, user information, and/or other parameters related to the state of the workspace for a unit of work), dependencies between one or more units of work, one or more custom fields (e.g., priority, cost, stage, and/or other custom fields), workload specification information, and/or other information.

The workload specification information may specify individual quantities of workload associated with individual units of work. The quantities of workload for individual units of work may include one or more of units of time, units of work production, and/or other measures. An individual unit of time may comprise one or more of a minute, an hour, a fraction (or percentage) of an hour, and/or other unit of time. The quantity of units of work production may include one or more of a quantity of lines of code, a quantity of lines of copy, and/or other information.

In some implementations, workload specification information may be determined based on user role information and/or other information. For example, an individual role may be associated with individual quantities of workload for individual units of work. By way of non-limiting illustration, a user having a "manager" role may be automatically assigned a first predetermined quantity of units of time for a given unit of work, while an other user having an "employee" role may be automatically assigned a second predetermined quantity of units of time for the given unit of work. Users having other roles may be automatically assigned predetermined quantities of workload for individual units of work.

In some implementations, workload specification information may be determined based on user input comprising user entry and/or selection of the individual quantities of units of workload associated with individual units of work.

In some implementations, the values of the workload parameters characterizing workload of the users may be based on aggregating the quantities of units of workload for a set of units of work assigned to a given user. By way of non-limiting illustration, by aggregating, for individual days, the individual quantities of workload associated with a set of units of work assigned to the given user that day may return the quantity of workload for that user as a whole for that day. Aggregating may include adding, averaging, and/or other measures.

The values of the work assignment parameter describing units of work assigned to the individual users may be determined based on one or more interactions by one or more users with a collaboration environment. In some implementations, one or more users may create and/or assign one or more unit of work to themselves and/or another user. In some implementations, a user may be assigned a unit of work and the user may effectuate a reassignment of the unit of work from the user or one or more other users.

In some implementations, values of the work assignment parameter may indicate that a status parameter of a unit of work has changed from "incomplete" to "marked complete" and/or "complete". In some implementations, a status of complete for a unit of work may be associated with the passing of an end date associated with the unit of work. In some implementations, a status of "marked complete" may be associated with a user providing input via the collaboration environment at the point in time the user completes the unit of work (which may be before or after an end date). In some implementations, for the purposes of measuring workload, values of the work assignment parameter for a unit of work indicating a status of "marked complete" and/or "complete" may be treated as if the unit of work is no longer assigned to the user for the purpose of measuring a current workload of the user.

The project information in project records 130 may define values of project parameters for projects managed within the collaboration environment. The project parameters may characterize one or more projects managed within the collaboration environment and/or via the collaboration work management platform, and/or the metadata associated with the one or more projects. Individual ones of the projects may be associated with individual ones of the project records. The project information may define values of the project parameters associated with a given project managed within the collaboration environment and/or via the collaboration work management platform. A given project may have one or more owners and/or one or more team members working on the given project. The given project may include one or more units of work assigned to one or more users under the given project heading.

The project parameters may, by way of non-limiting example, include one or more of: one or more units of work within individual ones of the projects (which may include work unit parameters defined by one or more work unit records), one or more user comment parameters (e.g., a creator, a recipient, one or more followers, one or more other interested parties, content, one or more times, upvotes, other hardcoded responses, etc.), a project name, a project description, one or more project dates (e.g., a start date, a due date, a completion date, and/or other project dates), one or more project members (e.g., an owner, one or more other project members, member access information, and/or other project members and/or member information), a status and/or progress (e.g., an update, a hardcoded status update, a measured status, quantity of units of work remaining in a given project, completed units of work in a given project, and/or other status parameter), one or more attachments, notification settings, privacy, an associated URL, one or more interaction parameters (e.g., sources of the interactions, context of the interactions, content of the interactions, time for the interactions, and/or other interaction parameters), updates, ordering of units of work within the given project, state of a workspace for a given task within the given project, other project parameters for the given project, and/or other project parameters, user parameters, and/or task parameters for one or more users and/or units of work the given project is associated with.

In some implementations, objective information in objective records may include values of one or more objective parameters. The values of the objective parameters may be organized in objective records corresponding to business objectives managed, created, and/or owned within the collaboration environment. Individual objective records may describe individual business objectives and identify sets of individual ones of the work unit records that specify the units of work associated with the individual business objectives. A given business objective may have one or more assignees, collaborators, and/or team members working on the given business objective. Business objectives may be created by a given user for the given user and/or created by the given user and assigned to be owned to one or more other users. Individual business objectives may include one or more of an individual goal, an individual sub-goal, and/or other business objectives assigned to be owned by a user and/or associated with one or more users. By way of non-limiting illustration, a first objective record may describe a first business objective and identify a first set of work unit records that specifies a first set of units of work associated with the first business objective.

In some implementations, business objectives may be derived from, and/or associated with, events and/or other information. The events may be external and/or integral to the collaboration environment. Events may include occurrences within an external resource and/or occurrences in the real world. External resources may include application programs accessible to the collaboration environment. An application program may be external to the collaboration environment and/or integrated into the collaboration environment. An application program external to the collaboration environment may be accessible by exiting (closing, minimizing, etc.) the environment and launching the application program separately. An application program integrated into the collaboration environment may be accessible within the environment and/or that access may not require leaving or exiting the environment. By way of non-limiting illustration, a business objective may be to reach a given quantity of subscribers on a social media page. The business objective may be derived from an event including a social media application showing subscribership to the social media page is reaching and/or exceeding the given quantity of subscribers. By way of non-limiting illustration, a business objective may be to increase the click-through-rate (CTR) on an ad on a webpage by a given percentage. The business objective may be derived from an event including an analytics program showing the CTR for the ad.

An occurrence within the real world may be determined through human observation with and/or without the assistance of a computer. By way of non-limiting illustration, a business objective may be to become more prominent in a given field of industry. The business objective may be derived from an event including the business being mentioned in an article written about the given field of industry. By way of non-limiting illustration, a business objective may be to onboard five new clients in a given month. The business objective may be derived from an event including observing the number of new clients being onboarded that given month. By way of non-limiting illustration, a business objective may be to increase the flow of foot traffic into a shop. The business objective may be derived from an event including observing the number of customers walking into the shop.

Individual sets of objective records may be defined by an objective record hierarchy. An objective record hierarchy may convey individual positions of objective records (and their corresponding business objectives) in the objective record hierarchy. By way of non-limiting illustration, a position may specify one or more of an objective record being superior to one or more other objective records, an objective record being subordinate to one or more other objective records, and/or other information. As a result, individual objective records may be subordinate and/or superior to other individual objective records. For example, the objective records may further include a second objective record. The first objective record and the second objective record may be organized by a first objective record hierarchy specifying that the second objective record is subordinate to the first objective record. Individual objective records may include hierarchical information defining an objective record hierarchy of the individual objective records. The hierarchical information of an objective record may include one or more of information identifying other objective records associated in an objective record hierarchy, a specification of the position of the objective record in the hierarchy, other relationships placed on the objective record by virtue of its position, and/or other information. In some implementations, as a consequence of the objective record hierarchies, the individual business objectives described in the individual objective records that are subordinate to the other individual objective records may be subordinate to the individual business objectives in the other individual objective records.

In some implementations, the one or more objective parameters may include one or more of an objective definition parameter, an objective progress parameter, and/or other parameters. The value of the objective definition parameter may describe a particular business objective. The values of an objective progress parameter may specify progress information for a particular business objective, and/or other information.

In some implementations, the business objectives may be described based on one or more of a business objective specification, one or more business objective dates (e.g., a start date, a due date, and/or dates), one or more members associated with a business objective (e.g., an owner, one or more other project/task members, member access information, and/or other business objective members and/or member information), one or more interaction parameters (e.g., indicating a given business objective was viewed, a given business objective was selected, how long the given business objective has been idle, a last interaction parameter indicating when and what user last interacted with the given business objective, users that interacted with the given business objective, and/or other interaction parameters indicating sources of the interactions, context of the interactions, content of the interactions and/or time for the interactions), notification settings, privacy, one or more custom fields (e.g., priority, cost, stage, and/or other custom fields), identification of units of work associated with a business objective, and/or other information.

A business objective specification may include one or more of what the business objective is (e.g., what is the desired outcome), an event associated with the business objective, an external resource associated with the business objective, and/or other information. Progress information for the individual business objectives may convey progress toward fulfillment of the individual business objectives. The progress information for the individual business objectives may convey progress toward fulfillment of the individual business objectives. In some implementations, the progress toward fulfillment of the business objectives may be specified as one or more of a quantitative value, a qualitative value, and/or other information.

It is noted that any metadata and/or values of parameters related to individual ones of the users, projects, business objectives, and/or units of work may be considered values of user parameters, project parameters, objective parameters, and/or work unit parameters. Further, it is to be noted that although units of work (e.g., in the form tasks and/or sub tasks), business objectives, and projects have been described separately herein, this is for illustrative purposes only. In some implementations, individual business objectives and/or individual projects may also be generically referred to as individual "units of work." Accordingly, in some implementations, reference to a "unit of work" may refer to one or more of a task and/or sub-task, a project, a business objective, and/or other work-related items which may be consider within the scope of the present disclosure.

The environment state component 108 may be configured to manage environment state information and/or other information used in maintaining a collaboration environment. The environment state information may include one or more of the user information, the work information, and/or other information used to define, support, and/or otherwise maintain a collaboration environment.

The environment state component 108 of machine-readable instructions 106 may be configured to effectuate transmission of the environment state information to client computing platform(s) 124, and/or vice versa. In some implementations, environment state component 108 may be configured to receive information over network 133 from client computing platforms(s) 124. Environment state component 108 may be configured to effectuate storage of the received information as environment state information to one or more user records 128, project records 130, work unit records 132, and/or other records. Environment state component 108 may be configured to obtain one or more user records 128, project records 130, work unit records 132, and/or other records in response to and/or based on one or more requests from client computing platform(s) 124. Environment state component 108 may be configured to effectuate transmission of values for user parameters, values for project parameters, values for work unit parameters, and/or other state information to client computing platform(s) 124. The values for user parameters, values for project parameters, values for work unit parameters, and/or other state information may be used to effectuate presentation of the relevant units of work and/or projects for a given user of the collaboration environment associated with the given client computing platform 124 to which the values and/or other state information is transmitted.

Collaboration environment component 110 of machine-readable instructions 107 of client computing platform(s) 124 may be configured to effectuate presentation of a collaboration environment. Presentation of the collaboration environment may be based on environment state information and/or other information.

The client computing platform(s) 124 may effectuate presentation of the collaboration environment. The collaboration environment may include the environment in which users interact with and/or view the one or more units of work and/or projects managed via the collaboration work management platform. The collaboration environment may exist whether or not a given user is viewing and/or interacting with the collaboration environment. In some implementations, projects managed vie the collaboration environment may include one or more units of work. By way of non-limiting example, the one or more units of work may include action items, to-do items, and/or objectives within a given project. The one or more units of work may be assigned to one or more users such that the one or more units of work assigned to a given user may appear on a given user's unit of work list within the collaboration environment.

In some implementations, user chat component 112 and/or chat application component 148 may be configured to implement individual instances of individual chat sessions to facilitate synchronous communication between users. User chat component 112 and/or chat application component 148 may receive an/or transmit the communications (e.g., textual communications, voice communications, video communications, etc.) that make up the chat sessions to the client computing platforms for presentation through graphical chat interfaces. The graphical chat interface may be presented on the client computing platforms 124 via display(s) 119 within and/or outside to the collaboration environment. The chat sessions may be hosted by the collaboration platform and/or one or more third party chat applications integrated with the collaboration platform via an application program interface (API). The chat sessions may be provided by one or more third-party chat applications via one or more APIs. In some implementations the collaboration platform may host and/or provide one or more of the chat sessions. The graphical chat interface may include its own interface and/or a portion of one or more collaboration environment interfaces for displaying one or more units of work, and/or projects for a given user.

In synchronous communication, individual users may receive communication inputs from other users in real-time or near real-time, i.e., without significant delay. In asynchronous communication, time delays may occur between sending communications inputs and receiving the sent communication inputs. In some implementations, the user chat component 112 and/or chat application component 148 may be configured to mediate asynchronous communication to ensure correct receiving orders.

The textual communications may be received and entered by the users via their respective client computing platforms and may be routed to and from the appropriate users through chat server(s) 140 via a chat session implemented by the chat application component 148. A chat session may include complete textual communication inputs from users who have participated in the chat session. The textual communication inputs in a chat session may be stored on and accessed from the electronic storage 142. In some examples, a chat session may be open ended such that it does not finish until a provider, administrator, moderator, and/or any other entities related to the collaboration environment decide not to provide the chat session. In some other examples, a chat session may be initiated and stopped by users at any time as desired.

The chat interface may include its own interface and/or a portion of one or more collaboration environment interfaces for displaying one or more units of work and/or projects for a given user. User chat component 112 may be configured to effectuate presentation of the graphical chat interfaces via the client computing platforms within and/or outside the collaboration environment. The chat sessions may include a first chat session between a first user and a second user. The first chat session may be presented to the first user via a first chat interface presented on a first client computing platform associated with the first user, and/or to the second user via a second chat interface presented on a second client computing platform associated with the second user.

In some implementations, the chat sessions may be between two users and/or more than two users. User chat component 112 may be configured to transcribe one or more spoken/audio communications. In some implementations, user chat component 112 may be configured to determine a source and/or intended recipient of individual chat items within the chat session.

Content component 114 may be configured to obtain content information characterizing content of the chat sessions between users of the collaboration environment. Content information for the chat sessions may be obtained at the conclusion of a chat session, and/or in real-time and/or near real-time during the chat session. Chat sessions may include a series of communications between two or more users of the collaboration environment. The chat sessions may include a messenger chat session (e.g., textual communications, graphical communication such as emoticons and/or images, file sharing, etc.), a video chat session, an audio chat session, and/or other chat sessions. In some implementations, the chat sessions may be related to and/or specific to a given project and/or unit of work within the collaboration environment. As such, the users participating in the given chat session may be working on and/or discussing the related and/or specific project and/or unit of work. The first chat session may be a unit of work-specific chat session. For example, the first chat session may relate to Unit of work A.

The content information obtained by content component 114 may describe the content included in a given chat session. By way of non-limiting example, that content information may include one or more communication inputs by the users within the chat sessions, one or more spoken and/or transcribed communications spoken by the users within the chat sessions, one or more words and/or phrases included in the chat sessions, a source of the spoken and/or textual communications, an intended recipient of the spoken and/or textual communications, and/or other content information. The communication inputs in the chat session may be presented through a graphical chat interface on the client computing platform(s) 124. The user may select a full and/or partial view of the graphical chat interface within the graphical user interfaces associated with the collaboration environment presented on the client computing platforms 124.

In some implementations, the content information may include context information. Context information may include setting information, content information for communications immediately preceding and/or following a trigger word and/or phrase, information describing the one or more units of work and/or projects the chat session relates to, user information for one or more of the users participating in the chat session (e.g., one or more projects and/or units of work associated with the user, the user's role/department/qualifications, historical user information, and/or other user information), and/or other context information. The first content information may include first context information wherein a first unit of work may be generated based on the first context information for the first chat session.

In some implementations, the chat sessions may facilitate synchronous and/or semi-synchronous communication between the users of the collaboration environment. By way of non-limiting example, the synchronous and/or semi-synchronous communication may include phone communications, video communications, messenger communications, and/or other communication.

Content component 114 may be configured to generate units of work for the users based on the content from the chat sessions and/or other information. In some implementations, the units of work may be generated in real-time and/or near real-time during the chat session. By way of non-limiting example, as the user starts typing within the chat interface, content component 114 may identify one or more potential units of work that should be generated. The units of work, in some implementations, may be generated at or near the conclusion of the chat sessions. In some implementations, one or more units of work to be generated based on the content from the chat sessions may be presented to one or more of the users as one or more potential units of work. The potential units of work may be presented to the one or more users for confirmation and/or acceptance. One or more of the users may accept and/or confirm one or more of the potential units of work at the conclusion of the given chat session to generate the units of work. A chat session may conclude when: a threshold amount of time passes without any communication from one or more users, a user exits or closes the chat interface, the user minimizes the chat interface, the user responds to a request with acceptance language (e.g., "sure", "okay", "will do", "I'll take care of it.", etc.) and/or the user otherwise concludes the chat session.

The content from the chat sessions that may trigger generation of the units of work for the users may include one or more trigger phrases and/or words. The trigger phrases and/or words may include one or more phrases or words that trigger generation of a user unit of work (see, e.g., trigger phrase component 116). In some implementations, content component 114 may be configured to determine and/or identify one or more trigger phrases and/or words based on determinations made by trigger phrase component 116.

In some implementations, the one or more units of work may be generated based on information from multiple users within a chat session being pieced together to generate the one or more units of work. Generating the one or more units of work may include determining and/or recommending which user(s) should be assigned the units of work, whether the unit of work should be dependent on one or more other units of work, and/or other values of parameters of the units of work based on the content from the chat session.

Content component 114 may be configured to identify potential assignees of the potential units of work based on the content from the chat sessions. In some implementations, content from the chat sessions that may trigger identification of potential assignees may include one or more trigger phrases and/or words. The trigger phrases and/or words may include one or more phrases and/or words that identify individual users (see, e.g., trigger phrase component 116). In some implementations, content component 114 and/or trigger phrase component 116 may be configured to determine and/or identify one or more trigger phrases and/or words that may trigger identification of potential assignees.

Content component 114 may be configured to obtain user records of the potential assignees and/or other information. Obtaining the user records may include obtaining values of the workload parameter and/or other parameters of the potential assignees.

In some implementations, user chat component 112 may be configured to implement an instance of a chat session through graphical chat interfaces by presenting a workload display pane and/or other portions within the chat interfaces. The workload display pane may provide the visual representation of the values of the workload parameter of one or more potential assignees (obtained via content component 114). The visual representation may aid the users of the chat session in making an appropriate selection of an assignee to the potential units of work.

In some implementations, potential units of work may be automatically generated and/or accepted by the users based on the content information. By way of non-limiting example, the content component 114 may be configured to identify acceptance language for generating units of work based on the content information for the chat sessions. Responsive to the content component 114 identifying acceptance language in response to communications triggering generation of a unit of work, content component 114 may automatically accept the potential unit of work on behalf of the user. In some implementations, in response to obtaining user input conveying selection of an individual potential assignee, content component 114 may generate the one or more units of work corresponding to one or more potential units of work based on the content from the chat sessions. By way of non-limiting illustration, generating a unit of work corresponding to a potential unit of work may include assigning the unit of work to the individual potential assignee. In some implementations, the content component 114 may be configured to identify acceptance language for selecting a potential assignees on the content information for the chat sessions. In some implementations, a user interface element may be provided where selection thereof may convey selection of an individual potential assignee.

In some implementations, content component 114 may identify one or more unit of work should and/or could be generate and/or provide one or more prompting questions for generating the one or more units of work. By way of non-limiting example, if user A starts typing to users B, C, and D "We need to follow-up with X supplier . . . ", content component 114 may prompt user A with one or more questions for generating the unit of work (e.g., "Who should follow up with X supplier?", "When do you want this user to follow up with X supplier by?", etc.). In some implementations, content component 114 may identify one or more potential assignees, obtain user records for the one or more potential assignees, instruct user chat component 112 to generate a workload display pane, provide one or more prompting questions for assigning a unit of work to an individual potential assignees, and/or perform other operations. By way of non-limiting example, if user A starts typing to users B, C, and D "We need to follow-up with X supplier . . . ", content component 114 may prompt user A with one or more questions for generating the unit of work (e.g., "Should User M follow up with X supplier?", "When do you want User M to follow up with X supplier by?", etc.). Content component 114 may generate the unit of work for following-up with X supplier based on the responses to these questions and/or other input, including selection of a potential assignee (e.g., User M).

In some implementations, the one or more potential assignees may be identified based on context of the chat sessions. For example, if a chat session is within the context of a given unit of work (and/or project and/or business objective), the one or more potential assignees may be users who are linked to the given unit of work.

Content component 114 may be configured to store information defining the units of work generated as part of the state information. As such, the first unit of work may be defined by a first work unit record. Content component 114 may be configured to communicate with collaboration environment component 110 and/or environment state component 108 to effectuate storage of the information defining the units of work generated as part of the state information.

In some implementations, content component 114 may be configured to modify one or more units of work based on the content from the chat sessions. Modifying one or more units of work may include one or more of changing, adjusting, adding, and/or removing one or more characteristics associated with individual ones of the units of work. By way of non-limiting example, the one or more characteristics of individual ones of the units of work may include one or more of a unit of work description, an assignee of a unit of work (e.g., a potential assignee as a new assignee), a due date, a start date, and/or other characteristics of the individual ones of the units of work. Content component 114 may be configured to store information defining modifications of the units of work as part of the state information. As such, a modification for a unit of work may defined in a work unit record for that unit of work.

Figure 2:
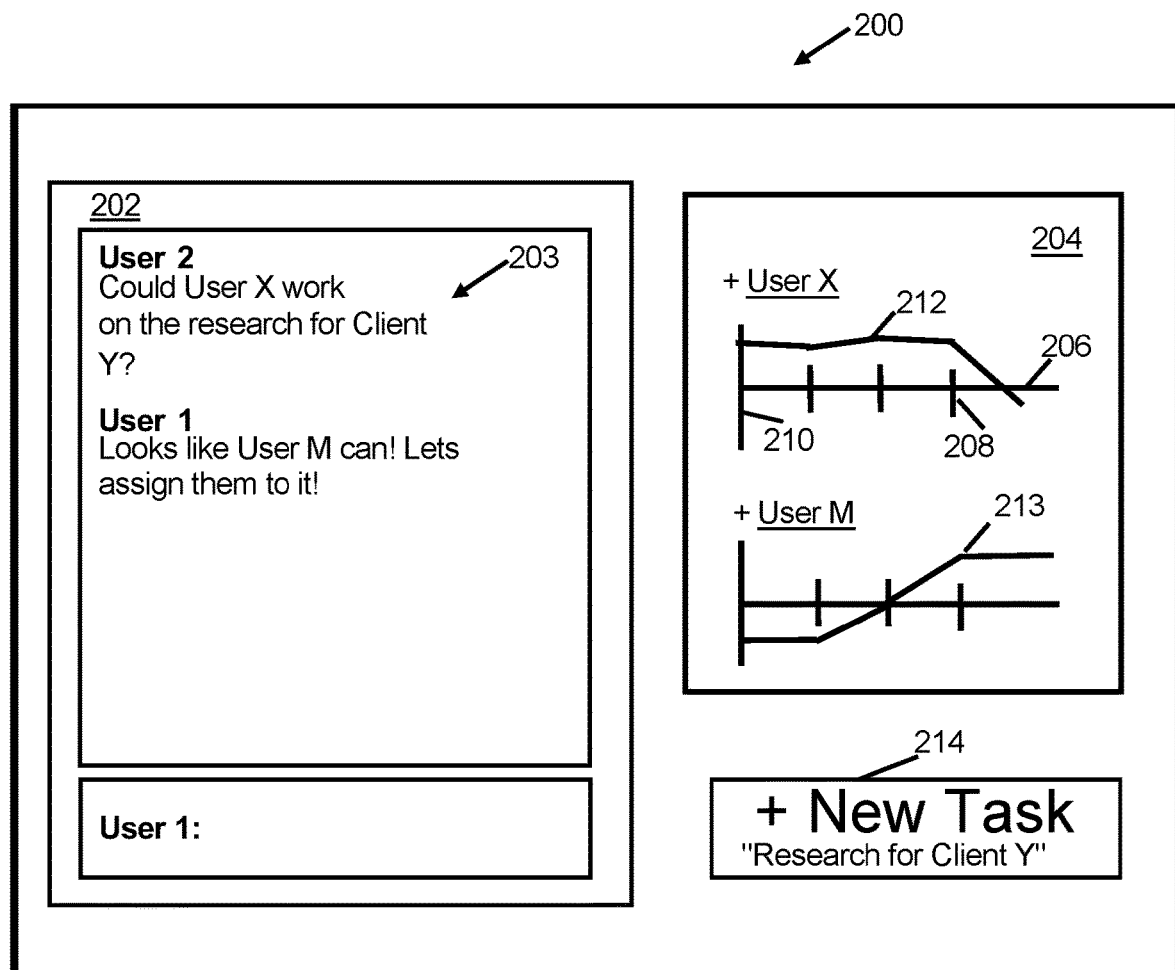
FIG. 2 illustrates an exemplary chat interface, in accordance with one or more implementations.

FIG. 2 illustrates an exemplary chat interface 200 from which content information is obtained and used as a basis for identifying potential assignees and generating units of work, in accordance with one or more implementations. In some implementations, chat interface 200 may be presented within a view of collaboration environment and/or outside of the collaboration environment. Textual communications 203 may be exchanged between User 1 and User 2 via a chat portion 202 of chat interface 200. Content information describing and/or including one or more textual communications 203 may be used to identify one or more potential assignees and/or generate one or more units of work. By way of non-limiting illustration, chat interface 200 may represent a first chat session between a first user (User 1) and a second user (User 2).

A first potential unit of work may be identified based on content information characterizing the content of the first chat session. By way of non-limiting illustration, the first potential unit of work may include "research for Client Y." A third user (User X) and a fourth user (User M) may be identified as potential assignees of the first potential unit of work based on the content information characterizing the content of the first chat session. By way of non-limiting illustration, the third user may be identified based on specific identification in the textual communications 203. The fourth user may be identified based on other techniques. A first user record for the third user and/or a second user record for the fourth user may be obtained, which may include values of the workload parameter characterizing workload of the users. A view of a first workload display pane 204 may be generated in chat interface 200 of the first chat session. The first workload display pane 204 may provide the visual representation of a first set of values for the workload parameter of the third user and a second set of values for the workload parameter of the fourth user.

By way of non-limiting illustration, the visual representation of the first set of values may include a first plot line 212 plotted with respect to a date axis 206 and a workload axis 210. The date axis 206 may show a date range incremented by date increment markings 208. The workload axis 210 may show quantities of the workload. The first plot line 212 may represent the quantities of the workload of the third user at different dates along the date range. A similar visual presentation for the fourth user may also be provided (as shown by second plot line 213 in first workload display pane 204). The visual representations may provide the users of the first chat session with information about which potential assignee (User X and User M) may be more equipped to handle the unit of work. A user interface element 214 may be provided to allow the users of the first chat session to complete an automated generation of a first unit of work, with and/or without a specific indication of which potential assignee should be assigned.

Returning to FIG. 1, trigger phrase component 116 may be configured to identify potential content in the content of the chat sessions that leads to initiation of one or more of the units of work by the users based on the environment state information. The potential content may include content that is likely to trigger generation of a user unit of work by a user. The content from the chat sessions that may trigger generation of the units of work for the users may include one or more trigger phrases and/or words. The trigger phrases and/or words may include one or more phrases or words that trigger generation of a user unit of work. In some implementations, trigger phrase component 116 may be configured to identify potential trigger phrases and/or words based on the potential content identified. In some implementations, content component 114 may be configured to determine and/or identify one or more trigger phrases and/or words. Trigger phrase component 116 may be configured to identify potential content in the content of the chat sessions that leads to initiation of one or more of the units of work by the users. The potential content that leads to initiation of one or more of the units of work in the collaboration environment by the users may be identified based on the environment state information.

Trigger phrase component 116 may be configured to identify potential trigger phrases and/or words based on the potential content identified. The trigger phrases and/or words may indicate an assignment and/or one user's request, desire, inquiry, and/or need to another user. By way of non-limiting example, trigger phrase component 116 may monitor chat sessions between users in the collaboration environment and/or identify that whenever a user states "Will you complete X . . . " they typically generate a unit of work for X shortly thereafter. As such, user chat component may identify "will you" as a trigger phrase. By way of non-limiting example, the trigger phrases and/or words may include one or more of will you, can you, could you, please, by a given date, before the given date, we need, I need, I want, would be grateful if, and/or you could.

Trigger phrase component 116 may be configured to identify potential content in the content of the chat sessions that leads to identification of one or more users as potential assignees. The potential content may include content that is likely to identify an individual user. The content from the chat sessions that may trigger identification of one or more users as potential assignees may include one or more trigger phrases and/or words. The trigger phrases and/or words may include one or more phrases or words that identify, directly and/or indirectly, an individual user. In some implementations, trigger phrase component 116 may be configured to identify potential trigger phrases and/or words based on the potential content identified. In some implementations, trigger phrase component 116 may be configured to determine and/or identify one or more trigger phrases and/or words. Trigger phrase component 116 may be configured to identify potential content in the content of the chat sessions that leads to identification of one or more users as potential assignees. The potential content that leads to identification of one or more users as potential assignees in the collaboration environment by the users may be identified based on the environment state information.

Trigger phrase component 116 may be configured to identify potential trigger phrases and/or words that least to identification of one or more users as potential assignees based on the potential content identified. The trigger phrases and/or words may include direct identification and/or indirect identification. By way of non-limiting example, user chat component 112 may monitor chat sessions between users in the collaboration environment and/or identify when a user's name, nickname, username, email address, phone number, and/or other directly identifying information is mentioned. In some implementations, user chat component 112 may monitor chat sessions between users in the collaboration environment and/or identify when information indirectly identifying a user is mentioned. By way of non-limiting illustration, indirect identification may include identification by role (e.g., "the boss", "the intern", etc.), status or role with respect to a unit of work (e.g., "the assignee" of "Unit of work X", "the assignor" of "unit of work Y", etc.), and/or other information.

In some implementations, server(s) 102, chat server(s) 140, client computing platform(s) 124, and/or external resource(s) 122 may be operatively linked via one or more electronic communication links. For example, such electronic communication links may be established, at least in part, via a network 133 such as the Internet and/or other networks. It will be appreciated that this is not intended to be limiting, and that the scope of this disclosure includes implementations in which server(s) 102, client computing platform(s) 124, and/or external resource(s) 122 may be operatively linked via some other communication media.

A given client computing platform may include one or more processors configured to execute computer program components. The computer program components may be configured to enable an expert or user associated with the given client computing platform to interface with system 100 and/or external resources 122, and/or provide other functionality attributed herein to client computing platform(s) 124.

External resources 122 may include sources of information outside of system 100, external entities participating with system 100, and/or other resources. In some implementations, some or all of the functionality attributed herein to external resources 122 may be provided by resources included in system 100.

Server(s) 102 may include electronic storage 126, one or more processors 104, and/or other components. Server(s) 102 may include communication lines, or ports to enable the exchange of information with a network and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102.

Processor(s) 104 may be configured to provide information processing capabilities in server(s) 102. As such, processor(s) 104 may include one or more of a digital processor, an analog processor, a digital circuit designed to process information, an analog circuit designed to process information, a state machine, and/or other mechanisms for electronically processing information. Although processor(s) are shown in FIG. 1 as single entities, this is for illustrative purposes only. In some implementations, processor(s) may include a plurality of processing units. These processing units may be physically located within the same device, or processor(s) may represent processing functionality of a plurality of devices operating in coordination. Processor(s) may be configured to execute components 108, 110, 112, 114, 116, 148, and/or other components. Processor(s) 104 may be configured to execute components 108, 110, 112, 114, 116, 148, and/or other components by software; hardware; firmware; some combination of software, hardware, and/or firmware; and/or other mechanisms for configuring processing capabilities on processor(s). As used herein, the term "component" may refer to any component or set of components that perform the functionality attributed to the component. This may include one or more physical processors during execution of processor readable instructions, the processor readable instructions, circuitry, hardware, storage media, or any other components.

It should be appreciated that although components 108, 110, 112, 114, 116, 148 are illustrated in FIG. 1 as being implemented within respective individual processing units, in implementations in which processor(s) includes multiple processing units, one or more of components 108, 110, 112, 114, 116, and/or 148 may be implemented remotely from the other components. The description of the functionality provided by the different components 108, 110, 112, 114, 116, and/or 148 described below is for illustrative purposes, and is not intended to be limiting, as any of components 108, 110, 112, 114, 116, and/or 148 may provide more or less functionality than is described. For example, one or more of components 108, 110, 112, 114, 116, and/or 148 may be eliminated, and some or all of its functionality may be provided by other ones of components 108, 110, 112, 114, 116, and/or 148. As another example, processor(s) may be configured to execute one or more additional components that may perform some or all of the functionality attributed below to one of components 108, 110, 112, 114, 116, and/or 148.

Figure 3:
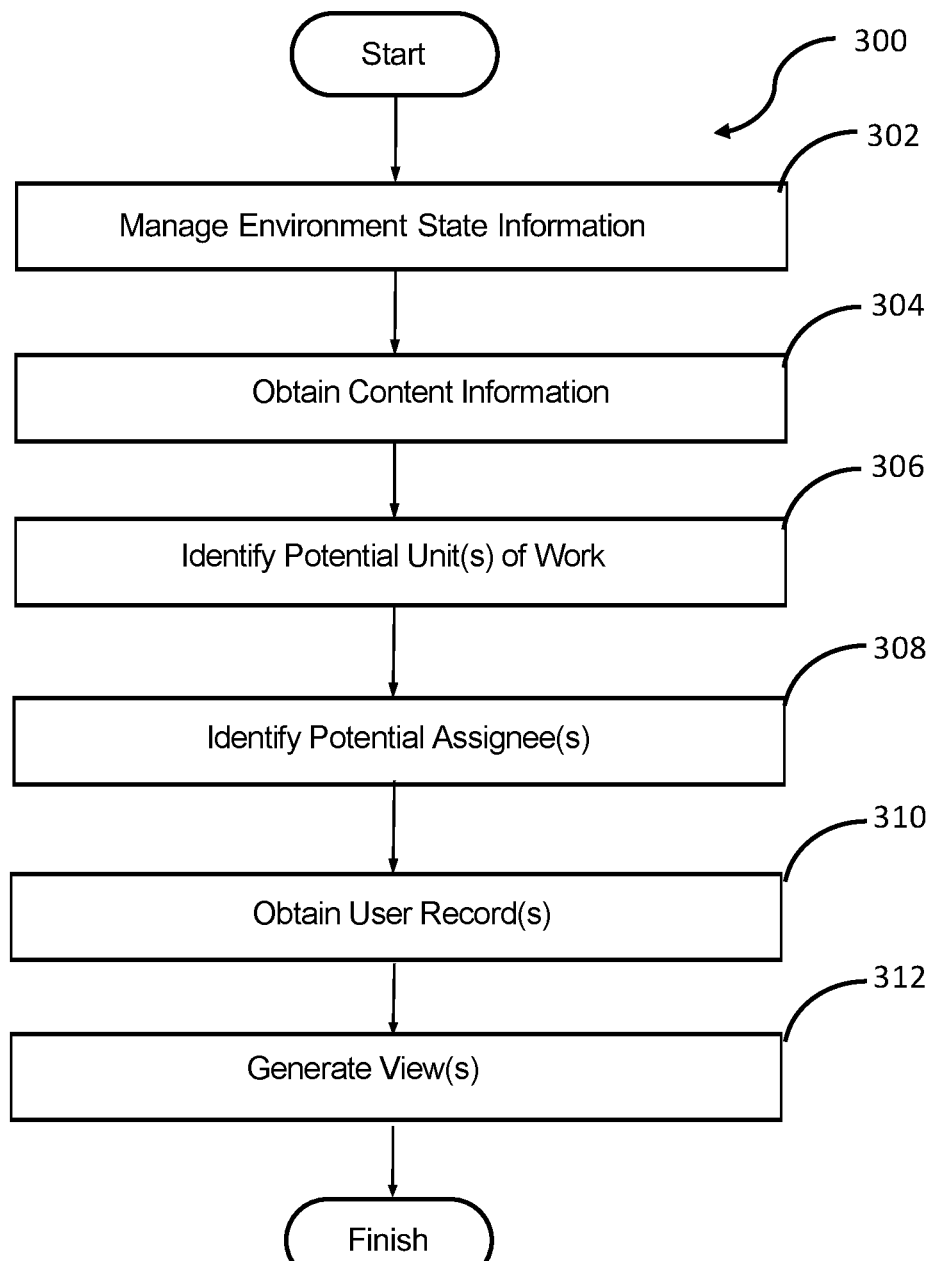
FIG. 3 illustrates a method to provide measures of user workload when generating units of work based on chat sessions between users of a collaboration environment, in accordance with one or more implementations.

FIG. 3 illustrates a method 300 to provide measures of user workload when generating units of work based on chat sessions between users of a collaboration environment, in accordance with one or more implementations. The operations of method 300 presented below are intended to be illustrative. In some implementations, method 300 may be accomplished with one or more additional operations not described, and/or without one or more of the operations discussed. Additionally, the order in which the operations of method 300 are illustrated in FIG. 3 and described below is not intended to be limiting.

In some implementations, method 300 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 300 in response to instructions stored electronically on an electronic storage medium. The one or more processing devices may include one or more devices configured through hardware, firmware, and/or software to be specifically designed for execution of one or more of the operations of method 300.

An operation 302 may include managing environment state information maintaining a collaboration environment. The collaboration environment may be configured to facilitate interaction by users with the collaboration environment. The environment state information may include one or more of user records, work unit records, and/or other information. The user records may include values of user parameters of the users. By way of non-limiting illustration, the user parameters may include a workload parameter characterizing workload of the users. The work unit records may describe units of work assigned to, created by, and/or managed by individual users within the collaboration environment. Operation 302 may be performed by one or more hardware processors configured by machine-readable instructions including a component that is the same as or similar to component 108 and/or 110 (shown in FIG. 1 and described herein), in accordance with one or more implementations.

An operation 304 may include obtaining content information characterizing content of chat sessions between the users of the collaboration environment. The chat sessions may facilitate synchronous communication between the users. The chat sessions include a first chat session between a first user and a second user. By way of non-limiting illustration, first content information characterizing first content of the first chat session may be obtained. Operation 304 may be performed by one or more hardware processors configured by machine-readable instructions including a component that is the same as or similar to component 114 (shown in FIG. 1 and described herein), in accordance with one or more implementations.

An operation 306 may include identifying potential units of work to be generated for one or more of the users based on the content from the chat sessions. By way of non-limiting illustration, a first potential unit of work may be identified based on the first content information characterizing the first content of the first chat session. Operation 306 may be performed by one or more hardware processors configured by machine-readable instructions including a component that is the same as or similar to component 114 (shown in FIG. 1 and described herein), in accordance with one or more implementations.

An operation 308 may include identifying potential assignees of the potential units of work based on the content from the chat sessions, such that a third user and a fourth user may be identified as potential assignees of the first potential unit of work based on the first content information characterizing the first content of the first chat session. Operation 308 may be performed by one or more hardware processors configured by machine-readable instructions including a component that is the same as or similar to component 114 (shown in FIG. 1 and described herein), in accordance with one or more implementations.

An operation 310 may include obtaining the user records of the potential assignees, including obtaining the values of the workload parameter of the potential assignees. By way of non-limiting illustration, a first user record for the third user and a second user record for the fourth user may be obtained. The first user record may include a first set of values for the workload parameter of the third user, and the second user record may include a second set of values for the workload parameter of the fourth user. Operation 310 may be performed by one or more hardware processors configured by machine-readable instructions including a component that is the same as or similar to component 114 (shown in FIG. 1 and described herein), in accordance with one or more implementations.

An operation 312 may include generating views of a workload display pane in graphical user interfaces of the chat sessions. The workload display pane may provide visual representation of the values of the workload parameter of the potential assignees. By way of non-limiting illustration, a view of a first workload display pane may be generated in the graphical user interfaces of the first chat session. The first workload display pane may provide the visual representation of the first set of values for the workload parameter of the third user and the second set of values for the workload parameter of the fourth user. Operation 312 may be performed by one or more hardware processors configured by machine-readable instructions including a component that is the same as or similar to component 112 (shown in FIG. 1 and described herein), in accordance with one or more implementations.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A method to provide visual representation of user workload in a chat session, the method being implemented in a computer system comprising one or more physical processors, and a computer-readable medium storing machine-readable instructions that, when executed by the one or more physical processors, cause the computer system to perform the method comprising:
   managing environment state information maintaining a collaboration environment, the environment state information including user records and work unit records, the user records describing users of the collaboration environment, the work unit records describing units of work created, managed, and/or assigned within the collaboration environment;
   obtaining content information characterizing content of a chat session between a first user and a second user of the collaboration environment;
   identifying a potential unit of work based on the content information;
   identifying a third user as a potential assignee of the potential unit of work based on the content information;
   obtaining a user record of the third user, the user record describing a workload of the third user; and
   generating a view of a workload display pane in a graphical user interface of the chat session, the workload display pane providing a visual representation of the workload of the third user.

2. The method of claim 1, wherein the graphical user interface is presented outside the collaboration environment.

3. The method of claim 1, wherein the graphical user interface includes a user interface element that, when selected, causes a work unit record for the potential unit of work to be generated.

4. The method of claim 3, further comprising:
   in response to obtaining user input conveying the selection of the user interface element, generating the work unit record.

5. The method of claim 4, further comprising:
   determining that the third user should be assigned to the work unit record based on the content information.

6. The method of claim 4, further comprising:
   automatically assigning the third user to the work unit record in response to determining that the third user should be assigned to the work unit record.

7. The method of claim 4, wherein the chat session is specific to a second work unit record, and wherein the work unit record is generated to be subordinate to the second work unit record.

8. The method of claim 1, wherein the visual representation of the workload of the third user includes a plot line plotted with respect to a date axis and a workload axis.

9. The method of claim 8, wherein the workload axis includes increments of units of time or units of production.

10. The method of claim 8, wherein the workload display pane further comprises a visual indication of workload capacity of the third user.

11. A system configured to provide visual representation of user workload in a chat session, the system comprising:
one or more physical processors; and
a computer-readable medium storing machine-readable instructions that, when executed by the one or more physical processors, cause the system to perform operations of:
manage environment state information maintaining a collaboration environment, the environment state information including user records and work unit records, the user records describing users of the collaboration environment, the work unit records describing units of work created, managed, and/or assigned within the collaboration environment;
obtain content information characterizing content of a chat session between a first user and a second user of the collaboration environment;
identify a potential unit of work based on the content information;
identify a third user as a potential assignee of the potential unit of work based on the content information;
obtain a user record of the third user, the user record describing a workload of the third user; and
generate a view of a workload display pane in a graphical user interface of the chat session, the workload display pane providing a visual representation of the workload of the third user.

12. The system of claim 11, wherein the graphical user interface is presented outside the collaboration environment.

13. The system of claim 11, wherein the graphical user interface includes a user interface element that, when selected, causes a work unit record for the potential unit of work to be generated.

14. The system of claim 13, wherein execution of the machine-readable instructions by the one or more physical processors further cause the system to perform operations of:
in response to obtaining user input conveying the selection of the user interface element, generate the work unit record.

15. The system of claim 14, wherein execution of the machine-readable instructions by the one or more physical processors further cause the system to perform operations of:
determine that the third user should be assigned to the work unit record based on the content information.

16. The system of claim 14, wherein execution of the machine-readable instructions by the one or more physical processors further cause the system to perform operations of:
automatically assign the third user to the work unit record in response to determining that the third user should be assigned to the work unit record.

17. The system of claim 14, wherein the chat session is specific to a second work unit record, and wherein the work unit record is generated to be subordinate to the second work unit record.

18. The system of claim 11, wherein the visual representation of the workload of the third user includes a plot line plotted with respect to a date axis and a workload axis.

19. The system of claim 18, wherein the workload axis includes increments of units of time or units of production.

20. The system of claim 18, wherein the workload display pane further comprises a visual indication of workload capacity of the third user.

* * * * *